United States Patent
Suzuki

(10) Patent No.: US 9,915,803 B2
(45) Date of Patent: Mar. 13, 2018

(54) OPTICAL SYSTEM, OPTICAL APPARATUS, AND METHOD FOR MANUFACTURING THE OPTICAL SYSTEM

(71) Applicant: Nikon Corporation, Minato-ku, Tokyo (JP)

(72) Inventor: Atsushi Suzuki, Tokyo (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 14/426,755

(22) PCT Filed: Feb. 14, 2014

(86) PCT No.: PCT/JP2014/000768
§ 371 (c)(1),
(2) Date: Mar. 8, 2015

(87) PCT Pub. No.: WO2014/129156
PCT Pub. Date: Aug. 28, 2014

(65) Prior Publication Data
US 2015/0226936 A1    Aug. 13, 2015

(30) Foreign Application Priority Data

Feb. 19, 2013  (JP) .................. 2013-029580
Feb. 19, 2013  (JP) .................. 2013-029581

(51) Int. Cl.
*G02B 9/12*  (2006.01)
*G02B 13/04*  (2006.01)
(Continued)

(52) U.S. Cl.
CPC .................. *G02B 9/12* (2013.01); *G02B 9/64* (2013.01); *G02B 13/002* (2013.01);
(Continued)

(58) Field of Classification Search
CPC ..................................... G02B 9/12; G02B 9/58
(Continued)

(56) References Cited

U.S. PATENT DOCUMENTS

| | | | |
|---|---|---|---|
| 4,089,591 A | 5/1978 | Glatzel et al. | |
| 4,984,878 A * | 1/1991 | Miyano | G02B 9/34 |
| | | | 359/783 |

(Continued)

FOREIGN PATENT DOCUMENTS

| | | |
|---|---|---|
| CN | 1278925 A | 1/2001 |
| CN | 100580498 C | 1/2010 |

(Continued)

OTHER PUBLICATIONS

International Search Report from International Patent Application No. PCT/JP2014/000768, dated May 20, 2014.
(Continued)

*Primary Examiner* — Darryl J Collins
(74) *Attorney, Agent, or Firm* — Shapiro, Gabor and Rosenberger, PLLC

(57) ABSTRACT

The present invention has, in order from an object: a first lens (L1) having negative refractive power; a second lens (L2), which is a positive meniscus lens having a convex surface facing the object; an aperture stop (S); and a third lens (L3) having a convex surface facing the object, and satisfies the following conditional expression (1):

$$6.6 < |f12/f|  \quad (1)$$

where f12 denotes a composite focal length of the first lens (L1) and the second lens (L2), and f denotes a focal length of the optical system (WL).

9 Claims, 22 Drawing Sheets

(51) Int. Cl.
*G02B 13/18* (2006.01)
*G02B 15/177* (2006.01)
*G02B 9/64* (2006.01)
*G02B 13/00* (2006.01)

(52) U.S. Cl.
CPC ........... *G02B 13/005* (2013.01); *G02B 13/04* (2013.01); *G02B 13/18* (2013.01); *G02B 15/177* (2013.01); *Y10T 29/49826* (2015.01)

(58) Field of Classification Search
USPC .................................................. 359/781–784
See application file for complete search history.

(56) References Cited

U.S. PATENT DOCUMENTS

| | | | | |
|---|---|---|---|---|
| 5,528,428 | A * | 6/1996 | Ohtake | G02B 9/60 359/684 |
| 5,909,307 | A * | 6/1999 | Koyama | G02B 13/14 359/356 |
| 6,324,014 | B1 | 11/2001 | Moskovich | |
| 6,498,687 | B1 | 12/2002 | Sekita et al. | |
| 6,545,819 | B1 | 4/2003 | Nanba et al. | |
| 6,825,993 | B2 * | 11/2004 | Noda | G02B 13/04 359/680 |
| RE39,911 | E | 11/2007 | Moskovich | |
| 7,639,432 | B2 * | 12/2009 | Asami | G02B 9/34 359/770 |
| 8,437,091 | B2 * | 5/2013 | Hsu | G02B 9/12 359/708 |
| 2003/0103267 | A1 | 6/2003 | Kasahara | |
| 2003/0133201 | A1 | 7/2003 | Nanba et al. | |
| 2003/0197951 | A1 | 10/2003 | Nanba et al. | |
| 2004/0257677 | A1 | 12/2004 | Matsusaka | |
| 2005/0024749 | A1 | 2/2005 | Nanba et al. | |
| 2005/0030642 | A1 | 2/2005 | Nanba et al. | |
| 2005/0041303 | A1 | 2/2005 | Nanba et al. | |
| 2006/0072212 | A1 | 4/2006 | Nanba et al. | |
| 2006/0238889 | A1 | 10/2006 | Nanba et al. | |
| 2006/0238890 | A1 | 10/2006 | Nanba et al. | |
| 2007/0211350 | A1 | 9/2007 | Kurioka | |
| 2008/0144193 | A1 * | 6/2008 | Adachi | G02B 9/60 359/770 |
| 2011/0080659 | A1 | 4/2011 | Kurashige | |
| 2013/0094099 | A1 * | 4/2013 | Ko | G02B 13/04 359/716 |
| 2013/0308206 | A1 * | 11/2013 | Hsu | G02B 13/0045 359/714 |
| 2014/0368931 | A1 * | 12/2014 | Noda | G02B 9/62 359/740 |

FOREIGN PATENT DOCUMENTS

| | | |
|---|---|---|
| JP | 51-120216 A | 10/1976 |
| JP | 56-011425 A | 2/1981 |
| JP | 05-107470 A | 4/1993 |
| JP | 05-203872 A | 8/1993 |
| JP | 10-142497 A | 5/1998 |
| JP | 10-170821 A | 6/1998 |
| JP | 2001-296476 A | 10/2001 |
| JP | 2001-523836 A | 11/2001 |
| JP | 2003-161878 A | 6/2003 |
| JP | 2004-258132 A | 9/2004 |
| JP | 2004-302056 A | 10/2004 |
| JP | 2005-010521 A | 1/2005 |
| JP | 2005-308905 A | 11/2005 |
| JP | 2007-025499 A | 2/2007 |
| JP | 2007-272216 A | 10/2007 |
| JP | 2008-033064 A | 2/2008 |
| JP | 2008-40033 A | 2/2008 |
| JP | 2008-065257 A | 3/2008 |
| JP | 2008-139416 A | 6/2008 |
| JP | 2008-241794 A | 10/2008 |
| JP | 2008-310364 A | 12/2008 |
| JP | 2009-025380 A | 2/2009 |
| JP | 2010-231190 A | 10/2010 |
| JP | 2011-076021 A | 4/2011 |
| WO | WO 99/26090 A1 | 5/1999 |

OTHER PUBLICATIONS

Decision of Refusal dated May 23, 2017, in Japanese Patent Application No. 2013-029581.

* cited by examiner (EXAMPLE 3)
WL(WL3)

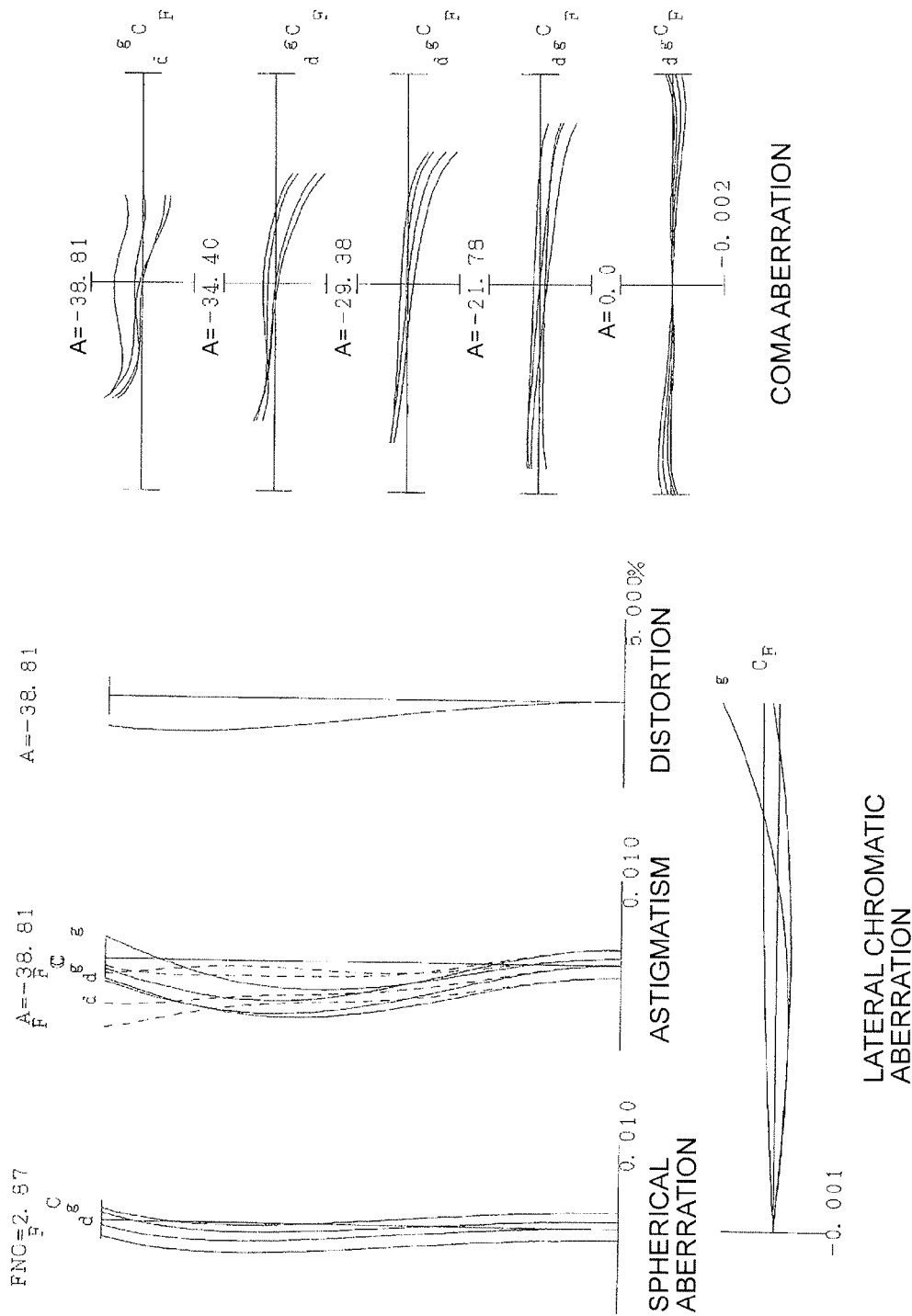

(EXAMPLE 6)

OPTICAL SYSTEM, OPTICAL APPARATUS, AND METHOD FOR MANUFACTURING THE OPTICAL SYSTEM

TECHNICAL FIELD

The present invention relates to an optimum optical system for an image capturing optical system, such as a digital camera, a film camera and a video camera.

TECHNICAL BACKGROUND

In recent years, compact single focus lenses having a wide angle of view have been proposed (e.g. see Patent Document 1). Most zoom lenses used for compact digital cameras lately use retractable type lens barrels—well-known lens barrels where the lens barrel is retracted into the camera when the camera is not used. Further, just like a zoom lens, a wide angle single focus lens having a wide angle of view, which can retract the lens barrel into the camera when the camera is not used, and of which focal length does not change with respect to an object point at infinity, has also been proposed (e.g. see Patent Document 2).

PRIOR ARTS LIST

Patent Documents

Patent Document 1: Japanese Laid-Open Patent Publication No. 2011-076021 (A)
Patent Document 2: Japanese Laid-Open Patent Publication No. 2008-40033 (A)

SUMMARY OF THE INVENTION

Problems to be Solved by the Invention

However, in the case of a conventional wide angle lens, the total length of the optical system is long and the front lens diameter is large. Therefore using this lens for a compact camera, which can retract the lens barrel into the camera when the camera is not used, is not advantageous in downsizing this camera. Further, the conventional single focus wide angle lens does not have sufficient brightness, and the total length of the optical system is long.

With the foregoing in view, it is an object of the present invention to provide an optical system and an optical apparatus having compactness and high optical performance, and a method for manufacturing the optical system.

Means to Solve the Problems

To achieve this object, an optical system according to a first aspect of the invention has, in order from an abject: a first lens having negative refractive power; a second lens, being a positive meniscus lens and having a convex surface facing the object; an aperture stop; and a third lens having a convex surface facing the object, and the following conditional expression is satisfied.

$$6.6 < |f12/f|$$

where f12 denotes a composite focal length of the first lens and the second lens, and f denotes a focal length of the optical system.

In the optical system according to the first aspect of the invention, it is preferable that the first lens is a negative meniscus lens having a concave surface facing the image.

In the optical system, according to the first aspect of the invention, it is preferable that the third lens has positive refractive power.

In the optical system according to the first aspect of the invention, it is preferable that the image side surface of the lens located closest to the image is aspherical.

In the optical system according to the first aspect of the invention, it is preferable that the first lens, the second lens and the third lens are all spherical lenses.

In the optical system according to the first aspect of the invention, it is preferable that the following conditional expression is satisfied.

$$0.75 < \{(-f1)/d\}/f < 1.20$$

where f1 denotes a focal length of the first lens, and d denotes a distance on the optical axis from the object side surface of the first lens to the image side surface of the lens located closest to the image.

An optical apparatus according to the first aspect of the invention includes any one of the above mentioned optical systems.

A method for manufacturing the optical system according to the first aspect of the invention is a method for manufacturing an optical system including, in order from an object, a first lens having negative refractive power, a second lens, being a positive meniscus lens and having a convex surface facing the object, an aperture stop, and a third lens having a convex surface facing the object, the method including: assembling each lens in a lens barrel so as to satisfy the following expression.

$$6.6 < |f12/f|$$

where f12 denotes a composite focal length of the first lens and the second lens, and f denotes a focal length of the optical system.

An optical system according to a second aspect of the invention has, in order from an object, a first lens group, an aperture stop and a second lens group, the first lens group includes, in order from the object, a negative lens and a positive lens, the second lens group includes the lens surface closest to the object that is a convex surface facing the object, and a positive lens disposed closest to the image, and the following conditional expression is satisfied.

$$0.172 < L1r2/L2r2 < 0.700$$

where L1r2 denotes a radius of curvature of the image side lens surface of the negative lens of the first lens group, and L2r2 denotes a radius of curvature of the image side lens surface of the positive lens of the first lens group.

In the optical system according to the second aspect of the invention, it is preferable that the first lens group has positive refractive power, and the negative lens of the first lens group has a concave surface facing the image.

In the optical system according to the second aspect of the invention, it is preferable that the following conditional expression is satisfied.

$$1.00 < f1/f2 < 9.00$$

where f1 denotes a focal length of the first lens group, and f2 denotes a focal length of the second lens group.

In the optical system according to the second aspect of the invention, it is preferable that the positive lens disposed closest to the image in the second lens group is a meniscus lens having a convex surface facing the image.

In the optical system according to the second aspect of the invention, it is preferable that the second lens group has at least two cemented lenses.

In the optical system according to the second aspect of the invention, it is preferable that the following conditional expression is satisfied.

$$1.9 < TL/f < 2.5$$

where TL denotes a length from the lens surface closest to the object in the optical system to the paraxial image surface, and f denotes a focal length of the optical system.

In the optical system according to the second aspect of the invention, it is preferable that the second lens group includes, in order from the object: a cemented lens of a positive lens having a convex surface facing the object and a negative lens having a concave surface facing the image; a cemented lens of a negative lens having a concave surface facing the object and a positive lens having a convex surface facing the image; and a positive meniscus lens having a convex surface facing the image.

In the optical system according to the second aspect of the invention, it is preferable that the second lens group includes at least one surface that is aspherical.

An optical apparatus according to the second aspect of the invention includes any one of the above mentioned optical systems.

A method for manufacturing the optical system according to the second aspect of the invention is a method for manufacturing an optical system including, in order from the object, a first lens group, an aperture stop, and a second lens group, the method including: assembling each lens in a lens barrel so that the first lens group includes, in order from the object, a negative lens and a positive lens, the second lens group includes a lens surface that is disposed closest to the object and that is a convex surface facing the object, and a positive lens disposed closest to the image, and the following conditional expression is satisfied.

$$0.172 < L1r2/L2r2 < 0.700$$

where $L1r2$ denotes a radius of curvature of the image side lens surface of the negative lens of the first lens group, and $L2r2$ denotes a radius of curvature of the image side lens surface of the positive lens of the first lens group.

Advantageous Effects of the Invention

The present invention can provide an optical system and an optical apparatus which are compact and have high optical performance, and a method for manufacturing the optical system.

BRIEF DESCRIPTION OF THE DRAWINGS

FIG. 6 are graphs showing various aberrations of the optical system according to Example 3 upon focusing on infinity;

FIG. 7 shows a digital camera (optical apparatus) including the optical system according to the embodiment represented by Examples 1 to 3, where

FIG. 20 shows a digital camera (optical apparatus) including the optical system according to the embodiment represented by Examples 4 to 8, where

DESCRIPTION OF THE EMBODIMENTS (1)

Embodiment 1 will now be described with reference to the drawings.

Figure 1:
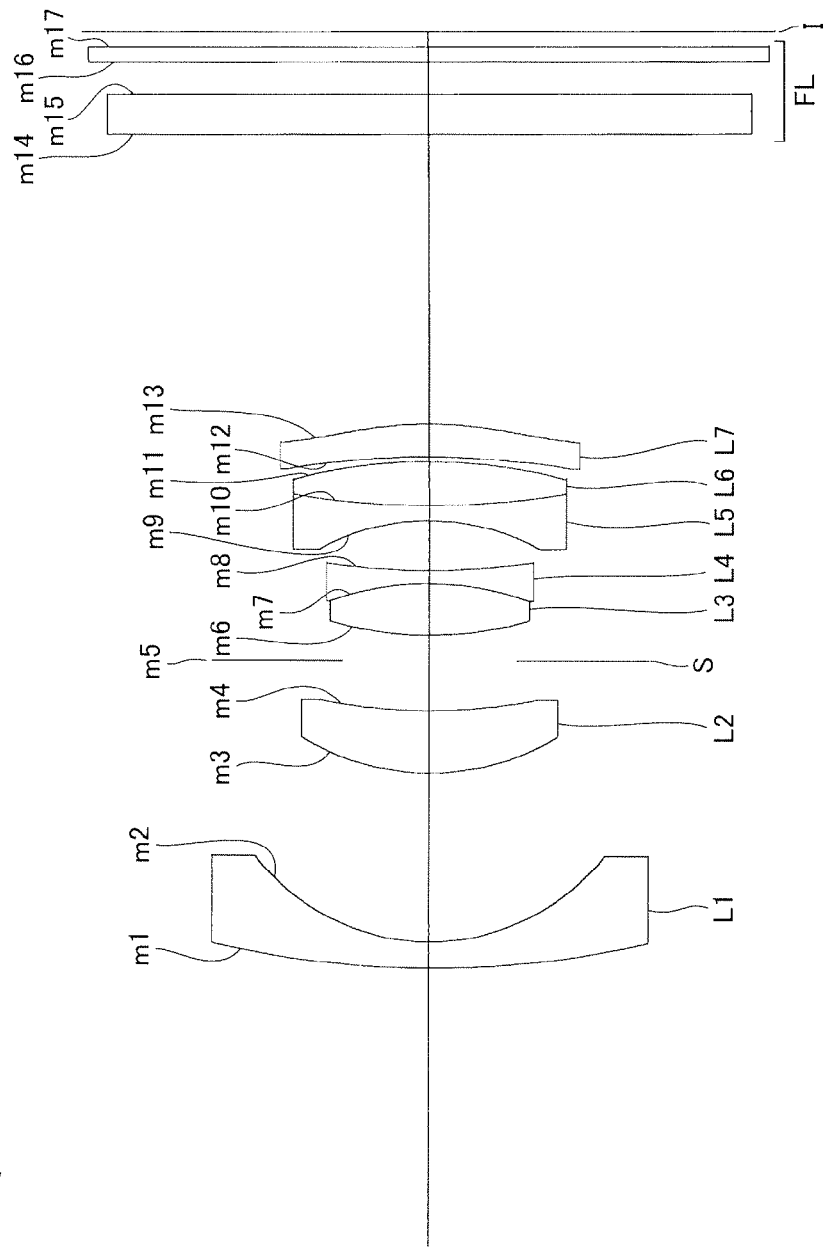
FIG. 1 is a cross-sectional view depicting a configuration of an optical system according to Example 1.

As illustrated in FIG. 1, an optical system WL of Embodiment 1 has, in order from an object, a first lens L1 having negative refractive power, a second lens L2, which is a positive meniscus lens having a convex surface facing the object, an aperture stop S, and a third lens L3 having a convex surface facing the object, and satisfies the following conditional expression (1).

$$6.6 < |f12/f| \tag{1}$$

where f12 denotes a composite focal length of the first lens L1 and the second lens L2, and f denotes a focal length of the optical system WL.

In designing an imaging optical system, such as a photograph lens, normally it is difficult to implement a wider angle of view and a larger aperture without increasing the size of the optical system. As the aperture becomes larger, it becomes difficult to correct spherical aberration while correcting coma aberration and astigmatism. Further, if the angle of view is widened without increasing the size of the optical system, it becomes difficult to correct spherical aberration, astigmatism and various chromatic aberrations.

In the optical system WL according to this embodiment which has the above configuration, however, the lens barrel can be retracted into the camera when the camera is not used, brightness (Fno: about 2.8) and a wide angle of view (about 75° can be implemented even if the size of the optical system is small, and spherical aberration, coma aberration and chromatic aberration can be corrected satisfactorily using a small number of lenses. Moreover, this optical system WL can contribute to making the camera slimmer by minimizing the thickness of the lens barrel portion in the retracted state.

This optical system WL is designed to be a retro focus type, in which a lens group having positive refractive power is disposed closer to the image than the first lens L1 having negative refractive power, therefore various aberrations including coma aberration and curvature of field can be suppressed, and the angle of view can be increased, even if the size of the optical system is small.

Further, the aperture stop S is disposed on the image side of the second lens L2, therefore distortion and curvature of field can be satisfactorily corrected while keeping the effective diameter of the first lens L1 closest to the object small.

The conditional expression (1) specifies the composite focal length of the first lens L1 and the second lens L2. By satisfying the conditional expression (1), coma aberration and distortion can be decreased.

If the composite focal length f12 is a positive value when the lower limit value of the conditional expression (1) is not reached, the refractive power of the second lens L2 becomes too high. This increases the radius of curvature on the image side surface of the second lens, and as a result, outward coma aberration increases and correcting this state becomes difficult. If the composite focal length f12 is a negative value when the lower limit value of the conditional expression (1) is not reached, the refractive power of the second lens L2 becomes too low. This decreases the radius of curvature on the image side surface of the second lens L2, and as a result, correction of the negative distortion becomes difficult. Moreover, the radius of curvature on the object side surface of the third lens L3 becomes too small. This increases the inward coma aberration, and as a result, correction of coma aberration in the third lens L3 and in the lenses disposed after the third lens L3 becomes difficult.

To demonstrate the effect of this embodiment with certainty, it is preferable that the lower limit value of the conditional expression (1) is 8.2.

In the optical system WL according to this embodiment, it is preferable that the first lens L1 is a negative meniscus lens having a concave surface facing the image. By this configuration, distortion and coma aberration can be satisfactorily corrected.

In the optical system WL according to this embodiment, it is preferable that the third lens L3 has positive refractive power. By this configuration, coma aberration can be satisfactorily corrected.

In the optical system WL according to this embodiment, it is preferable that the image side surface of the lens disposed closest to the image (image side surface m13 of the seventh lens L7 in the case of FIG. 1) is aspherical. By this configuration, the surface where the abaxial ray passes through a position that is distant from the optical axis becomes aspherical, hence aberrations of the lens system, including curvature of field and astigmatism, can be satisfactorily corrected.

In the optical system WL according to this embodiment, it is preferable that the first lens, the second lens and the third lens are all spherical lenses. By this configuration, the lens barrel can be manufactured at low cost while suppressing the variations of distortion and coma aberration.

In the optical system WL according to this embodiment, it is preferable that the following conditional expression (2) is satisfied.

$$0.75 < \{(-f1)/d\}/f < 1.20 \quad (2)$$

where f1 denotes a focal length of the first lens L1, and d denotes a distance on the optical axis from the object side surface of the first lens L1 to the image side surface of the lens located closest to the image.

The conditional expression (2) specifies the focal length of the first lens L1 and the length on the optical axis from the object side surface of the first lens L1 to the image side surface of the lens located closest to the image. By satisfying the conditional expression (2), coma aberration and distortion can be satisfactorily corrected, and a flat image plane can be acquired even if the size of the optical system is small.

If the lower limit value of the conditional expression (2) is not reached, the absolute value of the refractive power of the first lens L1 becomes too high. This allows to decrease the length of the first lens L1 and the second lens L2 on the optical axis with respect to the length on the optical axis from the object side surface of the first lens L1 to the image side surface of the lens located closest to the image, which is advantageous for downsizing, but the coma aberration and distortion generated in the first lens L1 and second lens L2 become too large, making it difficult to correct aberrations in the lens system.

If the upper limit value of the conditional expression (2) is exceeded, the absolute value of the refractive power of the first lens L1 becomes too small. Because of this, the length of the first lens L1 and the second lens L2 on the optical axis become too long with respect to the length on the optical axis from the object side surface of the first lens L1 to the image side surface of the lens located closest to the image. Therefore the length of the lenses disposed on the image side of the third lens L3 on the optical axis cannot be sufficiently guaranteed, which makes correction of coma aberration difficult. Further, the Petzval sum becomes too large, which makes it difficult to acquire a flat image plane.

To demonstrate the effect of this embodiment with certainty, it is preferable that the lower limit value of the conditional expression (2) is 0.78. To demonstrate the effect of this embodiment to the maximum, it is preferable that the lower limit value of the conditional expression (2) is 0.82.

To demonstrate the effect of this embodiment with certainty, it is preferable that the upper limit value of the conditional expression (2) is 1.07. To demonstrate the effect of this embodiment to the maximum, it is preferable that the upper limit value of the conditional expression (2) is 0.94.

According to the optical system WL having the above mentioned configuration of this embodiment, an optical system in which the lens barrel can be retracted into the camera when the camera is not used, but which still has compactness, wide angle of view, brightness and high optical performance can be implemented. Furthermore, a slimmer camera can be implemented by minimizing the thickness of the lens barrel portion in the retracted state.

Figure 7A:
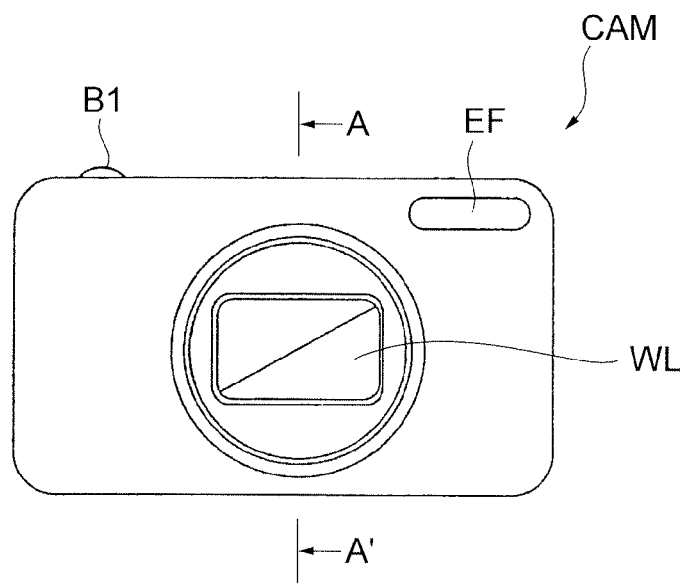
FIG. 7A is a front view.
Figure 7B:
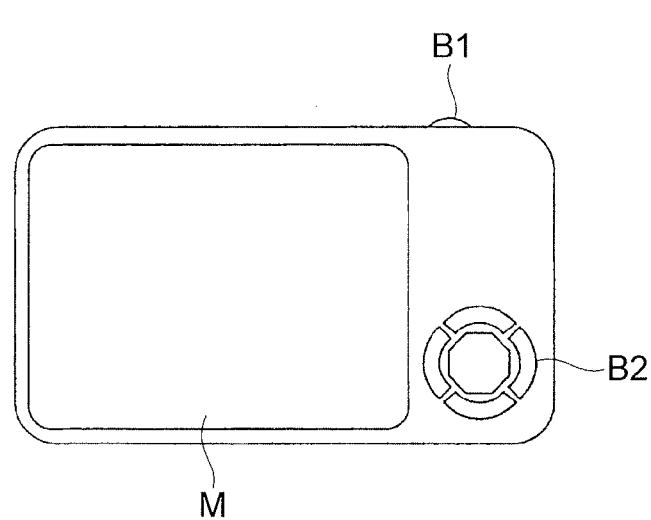
FIG. 7B is a rear view.
Figure 8:
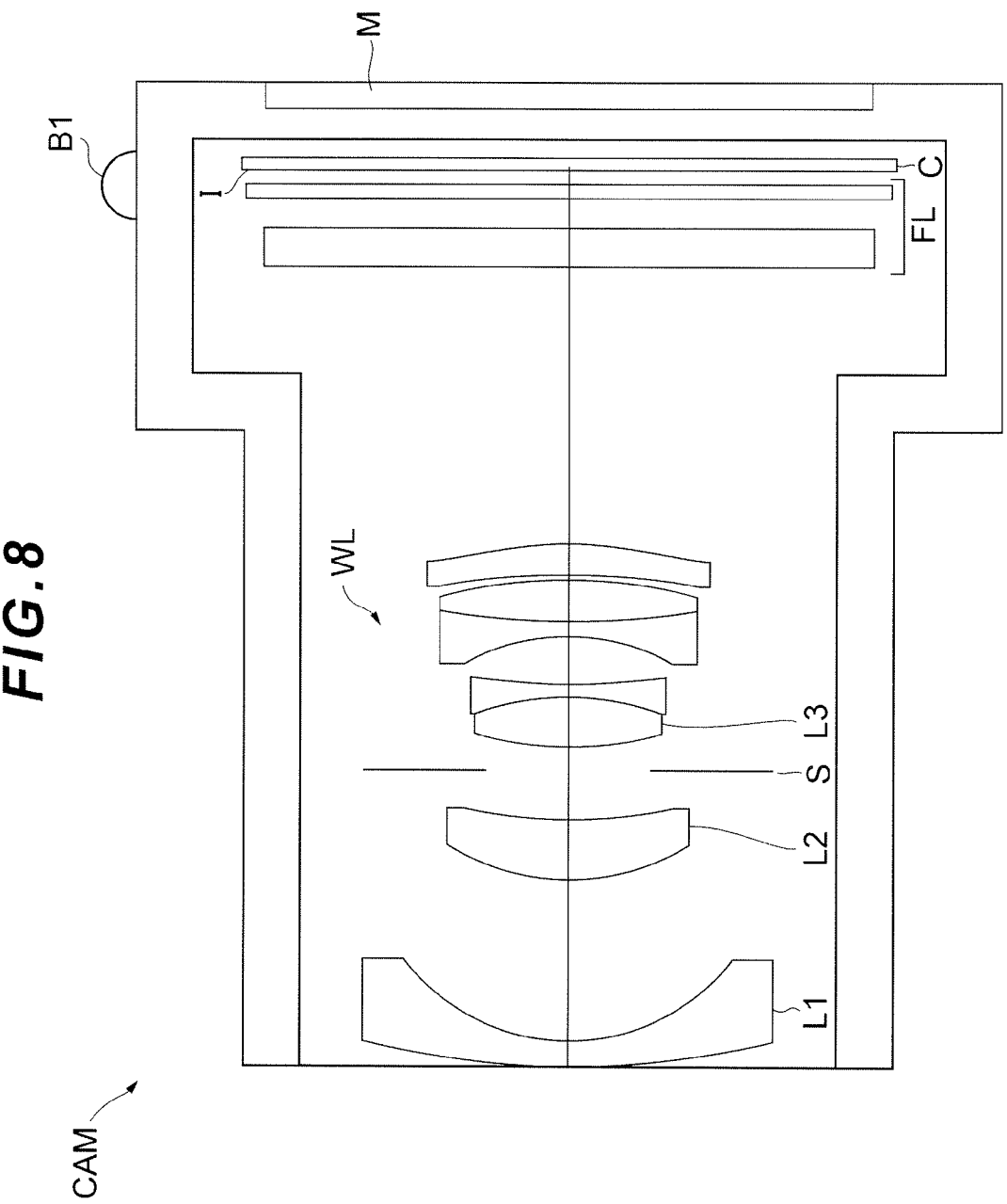
FIG. 8 is a cross-sectional view along the A-A' line in FIG. 7A.

FIG. 7 and FIG. 8 show a configuration of a digital still camera CAM (optical apparatus) as an optical apparatus including the optical system WL described above. In the digital still camera CAM, if a power button (not illustrated) is pressed, a shutter (not illustrated) of the image capturing lens (optical system WL) is opened, and light from an object is collected by the optical system WL and forms an image on a picture element C (e.g. CCD, CMOS) disposed on the image plane I (see FIG. 1). The object image formed on the picture element C is displayed on a liquid crystal monitor M, which is disposed on the rear face of the digital still camera CAM. The user determines a composition while viewing the liquid crystal monitor M, then presses a release button B1 to photograph the object image using the picture element C, and records and stores the image in a memory (not illustrated).

In the camera CAM, an auxiliary light emitting unit EF that emits auxiliary light when an object appears dark and a function button B2 that is used to set various conditions of the digital still camera CAM are disposed. Here a compact type camera, where the camera CAM and the optical system WL are integrated, is shown as an example, but the optical apparatus may be a single lens reflex camera, where the lens barrel having the optical system WL and a camera body are detachable.

According to the camera CAM having the above configuration, where the optical system WL is included as the image-capturing lens, a camera in which the lens barrel can be retracted into the camera when the camera is not used but which still has compactness, wide angle of view, brightness and high optical performance, can be implemented. Furthermore, a slimmer camera can be implemented by minimizing the thickness of the lens barrel portion in the retracted state.

Figure 9:
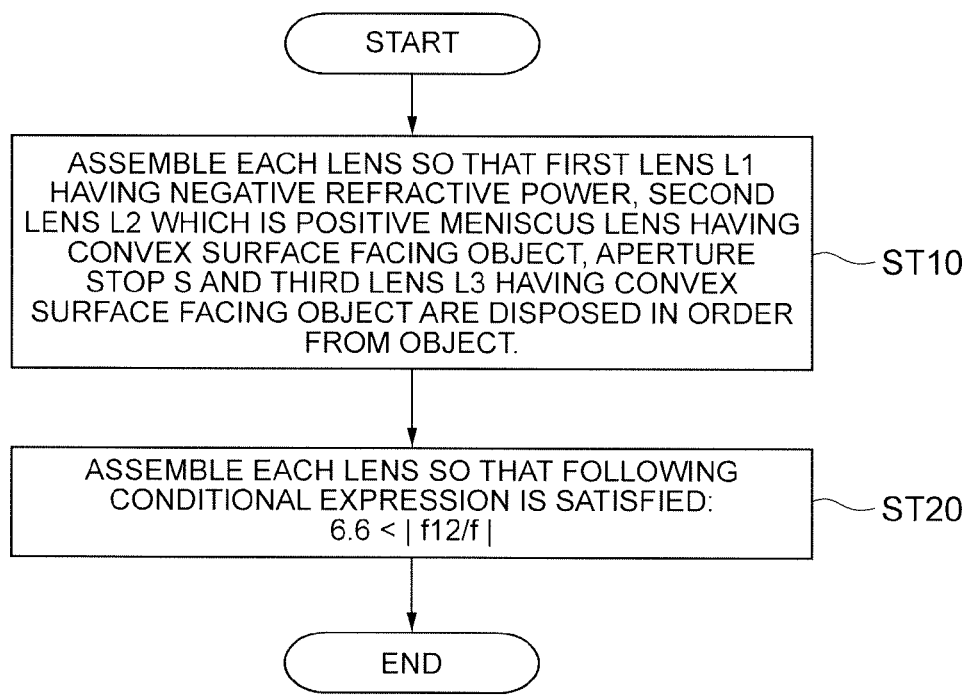
FIG. 9 is a flow chart depicting a method for manufacturing the optical system according to the embodiment represented by Examples 1 to 3.

Now a method for manufacturing the optical system WL will be described with reference to FIG. 9. First in the lens barrel each lens is assembled so that the first lens L1 having negative refractive power, the second lens L2, which is a positive meniscus lens having a convex surface facing the object, the aperture stop S and the third lens L3 having a convex surface facing the object, are disposed in order from the object (step ST10). In this step, in the lens barrel each lens is assembled so that the following expression (1) is satisfied (step ST20).

$$6.6 < |f12/f| \qquad (1)$$

where f12 denotes a composite focal length of the first lens L1 and the second lens L2, and f denotes a focal length of the optical system WL.

For example, in the lens configuration according to this embodiment, as illustrated in the optical system WL in FIG. 1, each lens is assembled in the lens barrel so that a negative meniscus lens L1 having a concave surface facing the image, a positive meniscus lens L2 having a convex surface facing the object, an aperture stop S, a cemented lens of a positive biconvex lens L3 and a negative biconcave lens L4, a cemented lens of a negative biconcave lens L5 and a positive biconvex lens L6, and a positive meniscus lens L7 having a convex surface facing the image, are disposed in order from an object. The optical system WL satisfies the conditional expression (1) (corresponding value: 6.615).

According to the method for manufacturing the optical system WL of this embodiment, an optical system in which the lens barrel can be retracted into the camera when the camera is not used, but which still has compactness, wide angle of view, brightness and high optical performance can be implemented. Furthermore, an optical system that can contribute to a slimmer camera can be implemented by minimizing the thickness of the lens barrel portion in the retracted state.

Example (1)

Each example of Embodiment 1 will now be described with reference to the drawings. Table 1 to Table 3 shown below are tables on each data in Example 1 to Example 3.

Each reference symbol in FIG. 1 related to Example 1 is independent from the other examples in order to prevent a complication of descriptions caused by an increase in the number of digits of a reference symbol. Therefore even if a reference symbol is the same in a drawing related to another example, this does not always mean that these composing elements are the same.

In each example, the aberration characteristics are calculated with respect to the C-line (wavelength: 656.2730 nm), the d-line (wavelength: 587.5620 nm), the F-line (wavelength: 486.1330 nm) and the g-line (wavelength: 435.8350 nm).

In [Lens Data] in each table, the surface number is the sequential number of the optical surface counted from the object side in the light traveling direction, R denotes the radius of curvature of each optical surface, D denotes a surface distance from each optical surface to the next optical surface (or image plane) on the optical axis, nd denotes a refractive index of the material of the optical member with respect to the d-line, and vd denotes an Abbe number of the material of the optical member with respect to the d-line. The object surface indicates the surface of the abject, (Variable) indicates a variable surface distance, radius of curvature "∞" indicates a plane or an aperture, (Stop S) indicates an aperture stop S, and image plane indicates an image plane I. The refractive index of air "1.00000" is omitted. If the optical surface is aspherical, "*" is affixed to the surface number, and the paraxial radius of curvature is shown in the column of the radius of curvature R.

In [Aspherical Data] in each table, a form of the aspherical surface in [Lens Data] is indicated by the following Expression (a). X(y) denotes a distance in the optical axis direction from a tangential plane at a vertex of the aspherical surface to a position on the aspherical surface at height y, r denotes a radius of curvature (paraxial radius of curvature) of the reference spherical surface, κ denotes a conical coefficient, and Ai denotes an aspherical coefficient of the i-th order. "E-n" indicates "×10$^{-n}$". For example, 1.234E−05=1.234×10$^{-5}$.

$$X(y) = (y^2/r)/\{1 + (1 - \kappa \times y^2/r^2)^{1/2}\} + \qquad (a)$$
$$A4 \times y^4 + A6 \times y^6 + A8 \times y^8 + A10 \times y^{10}$$

In [Various Data] in each table, f denotes a focal length of the optical system WL, Fno denotes an F number, ω denotes a half angle of view (maximum incident angle, unit: °), Y denotes an image height, BF denotes a back focus (distance from the last surface of the lens to the paraxial image plane on the optical axis, based on air conversion), and TL denotes a total lens length (distance from the first surface of the lens to the last surface of the lens on the optical axis+back focus). The above description is the same for the examples of Embodiment 2, which will be described later.

In [Conditional Expression], a value corresponding to each conditional expression (1) and (2) is shown.

In all the data values herein below, unless specifically indicated, "mm" is normally used as the unit of focal length f, radius of curvature R, surface distance D and other lengths, but the unit is not limited to "mm", and another appropriate unit may be used since an equivalent optical performance is obtained even if the optical system is proportionally expanded or proportionally reduced.

This description on the table is the same for all examples, and is therefore omitted below.

Example 1

Example 1 will be described with reference to FIG. 1, FIG. 2 and Table 1. As illustrated in FIG. 1, an optical system WL (WL1) according to Example 1 is a wide angle single focus lens, and has, in order from an object, a negative meniscus lens L1 having a concave surface facing the image, a positive meniscus lens L2 having a convex surface facing the object, an aperture stop S, a cemented lens of a positive biconvex lens L3 and a negative biconcave lens L4, a cemented lens of a negative biconcave lens L5 and a positive biconvex lens L6, a positive meniscus lens L7 having a convex surface facing the image and a filter group FL. The image side surface of the positive lens L7 is aspherical. The filter group FL is constituted by a low-pass filter, an infrared cut-off filter or the like, in order to cut off the spatial frequencies exceeding the critical resolution of a solid-state picture element (e.g. CCD, CMOS) disposed on the image plane I.

Table 1 shows each data value of Example 1. The surface numbers 1 to 17 in Table 1 correspond to each optical surface of m1 to m17 shown in FIG. 1 respectively. In Example 1, surface 13 is aspherical.

TABLE 1

[Lens Data]

| Surface number | R | D | nd | vd |
| --- | --- | --- | --- | --- |
| Object surface | ∞ | | | |
| 1 | 2.4315 | 0.0654 | 1.57957 | 53.74 |
| 2 | 0.5622 | 0.4212 | | |
| 3 | 0.6232 | 0.1563 | 1.77250 | 49.62 |
| 4 | 1.3691 | 0.1253 | | |
| 5(Stop S) | ∞ | 0.0641 | | |
| 6 | 0.9350 | 0.1303 | 1.88300 | 40.66 |
| 7 | −0.7187 | 0.0327 | 1.69895 | 30.13 |
| 8 | 1.7751 | 0.1252 | | |
| 9 | −0.5804 | 0.0381 | 1.69895 | 30.13 |
| 10 | 2.0786 | 0.1106 | 1.75500 | 52.33 |
| 11 | −1.3257 | 0.0109 | | |
| 12 | −2.1853 | 0.0817 | 1.79050 | 45.01 |
| *13(Aspherical) | −0.9637 | 0.7219 | | |
| 14 | ∞ | 0.0997 | 1.51680 | 64.20 |
| 15 | ∞ | 0.0801 | | |
| 16 | ∞ | 0.0381 | 1.51680 | 64.20 |
| 17 | ∞ | 0.0381 | | |
| Image plane | ∞ | | | |

[Aspherical Data]
Surface 13

κ = 1.0000, A4 = 1.0347E+00, A6 = 3.0500E+00, A8 = 6.0720E+00, A10 = −3.0169E+01

[Various Data]

| | |
| --- | --- |
| f | 1.00 |
| Fno | 2.88 |
| ω | 38.87 |
| Y | 0.790 |
| BF | 0.209 |
| TL | 2.293 |

TABLE 1-continued

[Conditional Expressions]

| | |
| --- | --- |
| f12 = 6.615 | |
| f = 1.000 | |
| f1 = −1.278 | |
| d = 1.362 | |
| Conditional expression (1) | \|f12/f\| = 6.615 |
| Conditional expression (2) | {(−f1)/d}/f = 0.939 |

As Table 1 shows, the optical system WL1 of Example 1 satisfies the conditional expressions (1) and (2).

Figure 2:
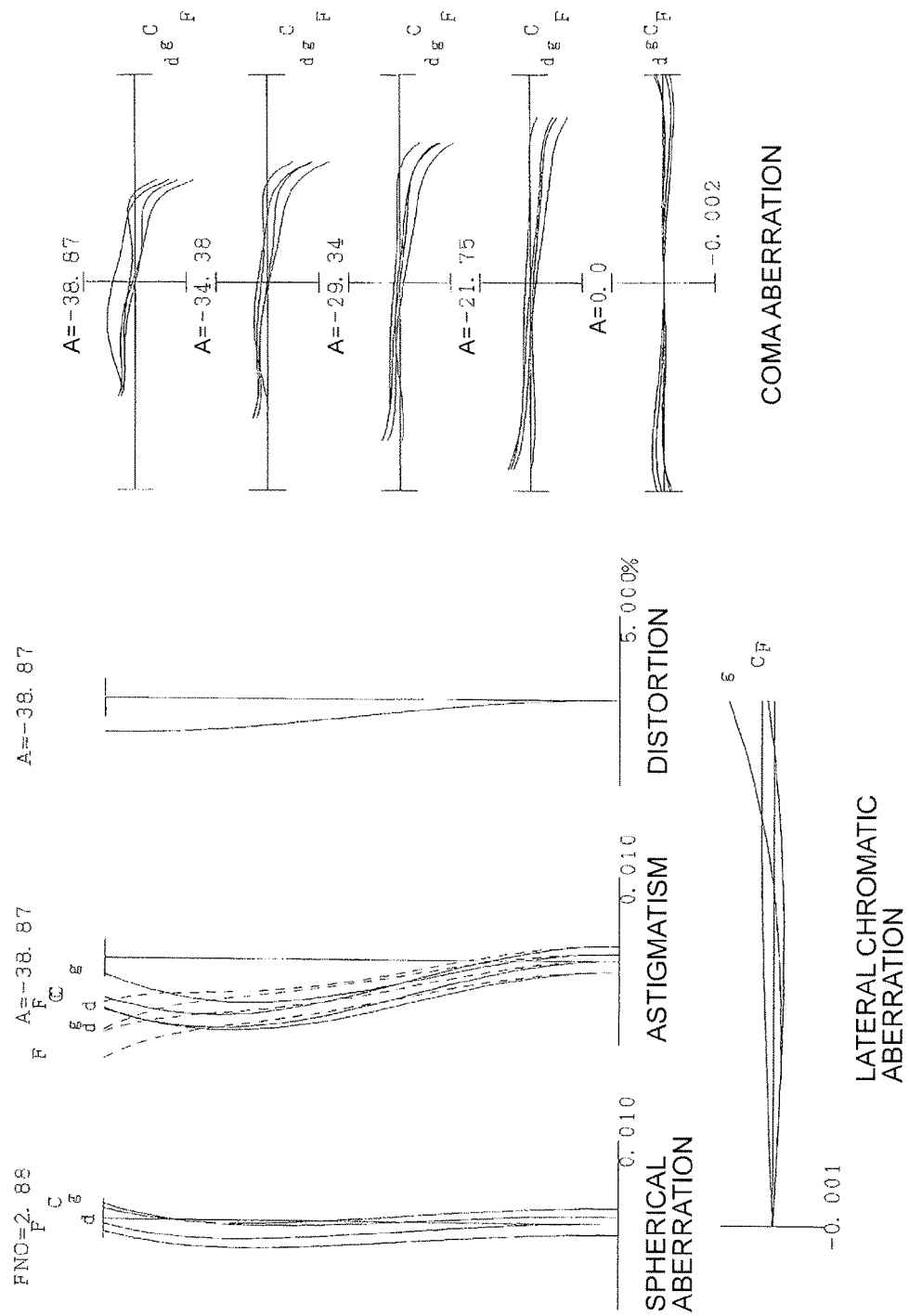
FIG. 2 are graphs showing various aberrations of the optical system according to Example 1 upon focusing on infinity.

FIG. 2 are graphs showing various aberrations (spherical aberration, astigmatism, distortion, coma aberration and lateral chromatic aberration) of the optical system WL1 according to Example 1 upon focusing on infinity.

In each graph showing aberrations, FNO denotes an F number and A denotes a half angle of view with respect to each image height (unit: °). d indicates aberration at the d-line, g indicates aberration at the g-line, C indicates aberration at the C-line, and F indicates aberration at the F-line. No indication means aberration at the d-line. In graphs showing astigmatism, the solid line indicates a sagittal image surface, and the broken line indicates a meridional image surface. The reference symbols of this example are the same for graphs showing various aberrations in each example to be described later.

As each graph showing aberrations in FIG. 2 clarifies, various aberrations are corrected satisfactorily, demonstrating that the optical system WL1 according to Example 1 has excellent image forming performance.

Example 2

Figure 3:
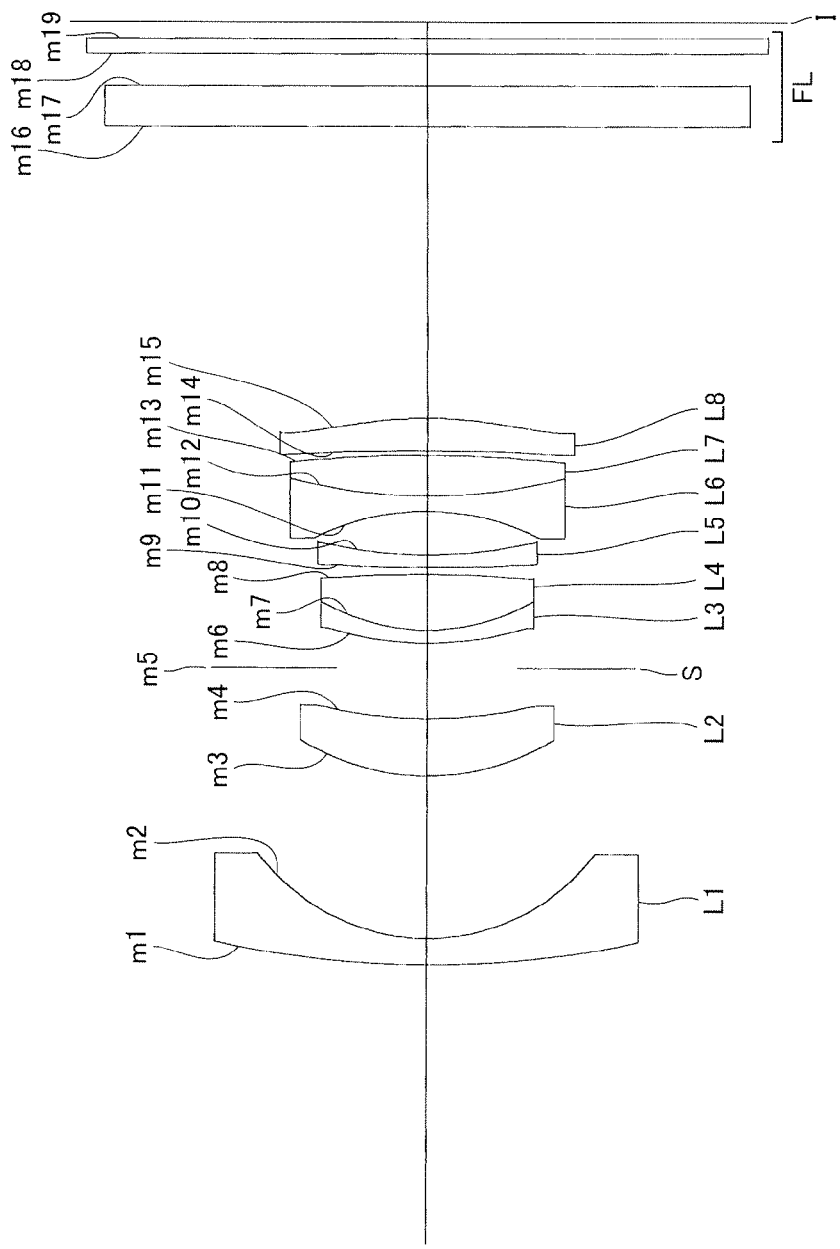
FIG. 3 is a cross-sectional view depicting a configuration of an optical system according to Example 2.

Example 2 will be described with reference to FIG. 3, FIG. 4 and Table 2. As illustrated in FIG. 3, an optical system WL (WL2) according to Example 2 is a wide angle single focus lens, and has, in order from an object, a negative meniscus lens L1 having a concave surface facing the image, a positive meniscus lens L2 having a convex surface facing the object, an aperture stop S, a cemented lens of a negative meniscus lens L3 having a concave surface facing the image and a positive biconvex lens L4, a negative meniscus lens L5 having a concave surface facing the image, a cemented lens of a negative biconcave lens L6 and a positive biconvex lens L7, a positive meniscus lens L8 having a convex surface facing the image, and a filter group FL. The image side surface of the positive lens L8 is aspherical. The filter group FL is constituted by a low-pass filter, an infrared cut-off filter or the like, in order to cut off the spatial frequencies exceeding the critical resolution of a solid-state picture element (e.g. CCD, CMOS) disposed on the image plane I.

Table 2 shows each data value of Example 2. The surface numbers 1 to 19 in Table 2 correspond to each optical surface of m1 to m19 shown in FIG. 3 respectively. In Example 2, surface 15 is aspherical.

TABLE 2

[Lens Data]

| Surface number | R | D | nd | vd |
| --- | --- | --- | --- | --- |
| Object surface | ∞ | | | |
| 1 | 2.5432 | 0.0656 | 1.57957 | 53.74 |
| 2 | 0.5326 | 0.4071 | | |
| 3 | 0.6168 | 0.1420 | 1.77250 | 49.62 |
| 4 | 1.1916 | 0.1256 | | |

TABLE 2-continued

| | | | | |
|---|---|---|---|---|
| 5(Stop S) | ∞ | 0.0642 | | |
| 6 | 0.8504 | 0.0328 | 1.75520 | 27.57 |
| 7 | 0.5357 | 0.1398 | 1.83481 | 42.73 |
| 8 | −3.2045 | 0.0164 | | |
| 9 | 4.7788 | 0.0328 | 1.69895 | 30.13 |
| 10 | 1.2177 | 0.1093 | | |
| 11 | −0.6377 | 0.0382 | 1.74077 | 27.74 |
| 12 | 1.3832 | 0.1011 | 1.88300 | 40.66 |
| 13 | −3.4888 | 0.0109 | | |
| 14 | −6.4196 | 0.0819 | 1.79050 | 45.01 |
| *15(Aspherical) | −1.0007 | 0.7290 | | |
| 16 | ∞ | 0.1000 | 1.51680 | 64.20 |
| 17 | ∞ | 0.0803 | | |
| 18 | ∞ | 0.0382 | 1.51680 | 64.20 |
| 19 | ∞ | 0.0382 | | |
| Image plane | ∞ | | | |

[Aspherical Data]
Surface 15

κ = 1.0000, A4 = 1.2112E+00, A6 = 4.1370E+00, A8 = 1.1038E+00, A10 = −1.0369E+01

[Various Data]

| | |
|---|---|
| f | 1.00 |
| Fno | 2.88 |
| ω | 38.87 |
| Y | 0.790 |
| BF | 0.210 |
| TL | 2.304 |

[Conditional Expressions]

| | |
|---|---|
| f12 = 2843.643 | |
| f = 1.000 | |
| f1 = −1.176 | |
| d = 1.366 | |
| Conditional expression (1) | \|f12/f\| = 2843.643 |
| Conditional expression (2) | {(−f1)/d}/f = 0.861 |

As Table 2 shows, the optical system WL2 of Example 2 satisfies the conditional expressions (1) and (2).

Figure 4:
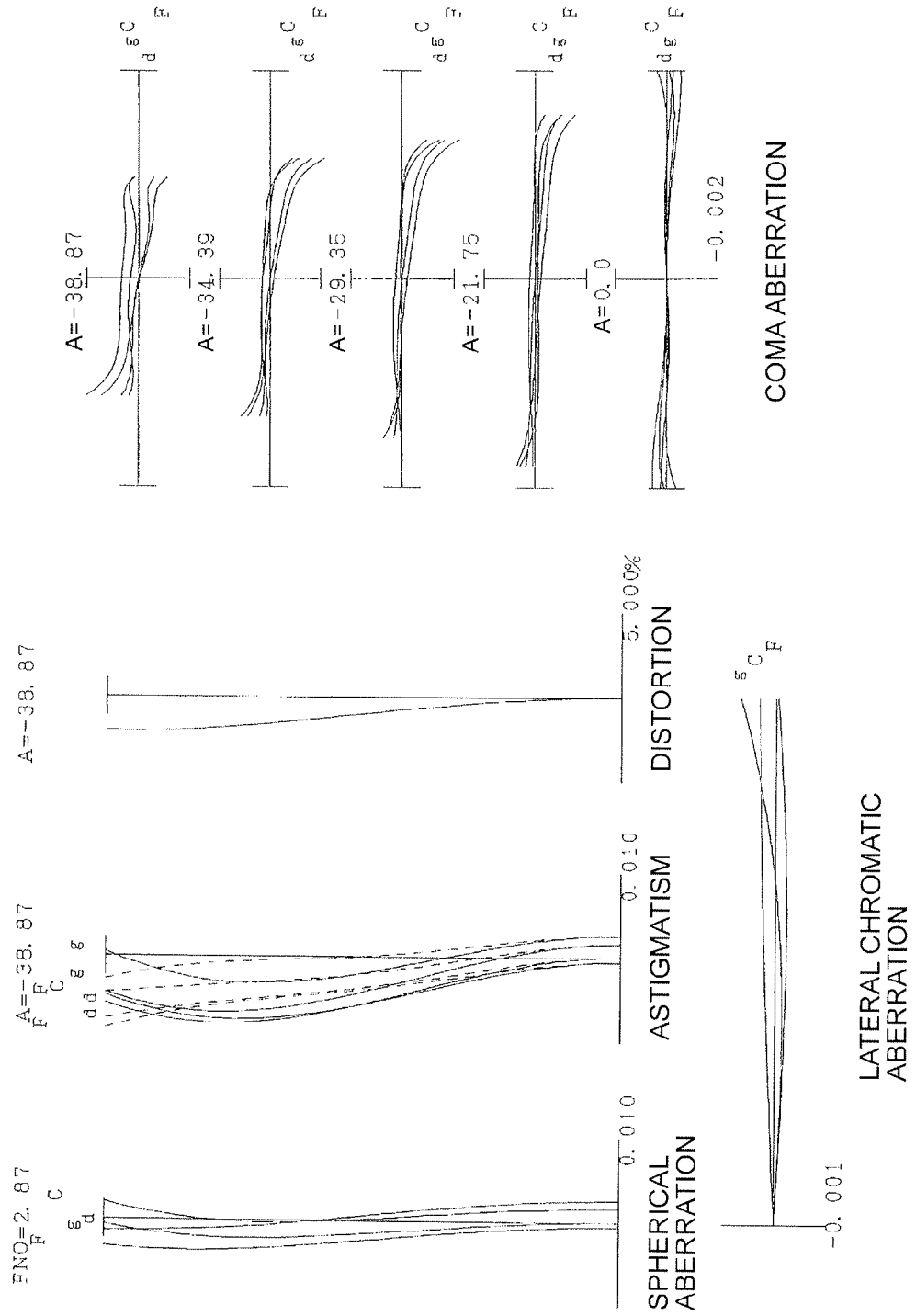
FIG. 4 are graphs showing various aberrations of the optical system according to Example 2 upon focusing on infinity.

FIG. 4 are graphs showing various aberrations (spherical aberration, astigmatism, distortion, coma aberration and lateral chromatic aberration) of the optical system WL2 according to Example 2 upon focusing on infinity. As each graph showing aberrations in FIG. 4 clarifies, various aberrations are corrected satisfactorily, demonstrating that the optical system WL2 according to Example 2 has excellent image forming performance.

Example 3

Figure 5:
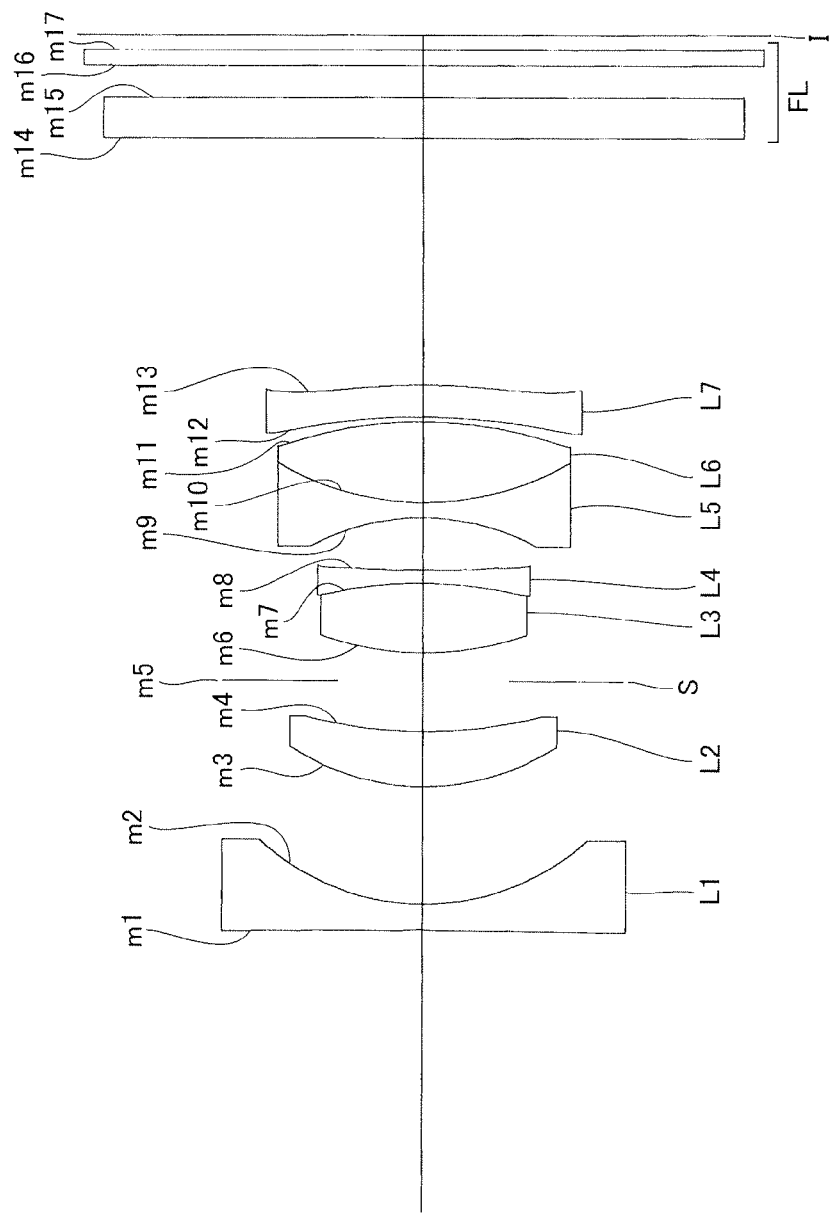
FIG. 5 is a cross-sectional view depicting a configuration of an optical system according to Example 3.

Example 3 will be described with reference to FIG. 5, FIG. 6 and Table 3. As illustrated in FIG. 5, an optical system WL (WL3) according to Example 3 is a wide angle single focus lens, and has, in order from an object, a negative biconcave lens L1, a positive meniscus lens L2 having a convex surface facing the object, an aperture stop S, a cemented lens of a positive biconvex lens L3 and a negative biconcave lens L4, a cemented lens of a negative biconcave lens L5 and a positive biconvex lens L6, a positive meniscus lens L7 having a convex surface facing the image, and a filter group FL. The image side surface of the positive lens L7 is aspherical. The filter group FL is constituted by a low-pass filter, an infrared cut-off filter or the like, in order to cut off the spatial frequencies exceeding the critical resolution of a solid-state picture element (e.g. CCD, CMOS) disposed on the image plane I.

Table 3 shows each data value of Example 3. The surface numbers 1 to 17 in Table 3 correspond to each optical surface of m1 to m17 shown in FIG. 5 respectively. In Example 3, surface 13 is aspherical.

TABLE 3

[Lens Data]

| Surface number | R | D | nd | νd |
|---|---|---|---|---|
| Object surface | ∞ | | | |
| 1 | −27.2331 | 0.0654 | 1.53172 | 48.78 |
| 2 | 0.6131 | 0.2945 | | |
| 3 | 0.6157 | 0.1371 | 1.79500 | 45.31 |
| 4 | 1.2285 | 0.1253 | | |
| 5(Stop S) | ∞ | 0.0709 | | |
| 6 | 0.7852 | 0.1742 | 1.88300 | 40.66 |
| 7 | −1.1215 | 0.0327 | 1.75211 | 25.05 |
| 8 | 3.6019 | 0.1308 | | |
| 9 | −0.5994 | 0.0381 | 1.69895 | 30.13 |
| 10 | 0.7386 | 0.2002 | 1.79952 | 42.09 |
| 11 | −1.0774 | 0.0109 | | |
| 12 | −1.7584 | 0.0817 | 1.79050 | 45.01 |
| *13(Aspherical) | −1.4860 | 0.6197 | | |
| 14 | ∞ | 0.0997 | 1.51680 | 64.20 |
| 15 | ∞ | 0.0801 | | |
| 16 | ∞ | 0.0381 | 1.51680 | 64.20 |
| 17 | ∞ | 0.0382 | | |
| Image plane | ∞ | | | |

[Aspherical Data]
Surface 13

κ = 1.0000, A4 = 1.1761E+00, A6 = 3.3115E+ 00, A8 = 2.5924E−01, A10 = −8.3866E+00

[Various Data]

| | |
|---|---|
| f | 1.00 |
| Fno | 2.88 |
| ω | 38.87 |
| Y | 0.790 |
| BF | 0.209 |
| TL | 2.191 |

[Conditional Expressions]

| | |
|---|---|
| f12 = −26.323 | |
| f = 1.000 | |
| f1 = −1.127 | |
| d = 1.362 | |
| Conditional expression (1) | \|f12/f\| = 26.323 |
| Conditional expression (2) | {(−f1)/d}/f = 0.827 |

As Table 3 shows, the optical system WL3 of Example 3 satisfies the conditional expressions (1) and (2).

FIG. 6 are graphs showing various aberrations (spherical aberration, astigmatism, distortion, coma aberration and lateral chromatic aberration) of the optical system WL3 according to Example 3 upon focusing on infinity. As each graph showing aberrations in FIG. 6 clarifies, various aberrations are corrected satisfactorily, demonstrating that the optical system WL3 according to Example 3 has excellent image forming performance.

According to each example described above, an optical system where the lens barrel can be retracted into the camera when the camera is not used, but which still has compactness, brightness (Fno: about 2.8), and a wide angle of view (about 75°) can be implemented, and in this optical system, various aberrations including spherical aberration, coma aberration and lateral chromatic aberration can be satisfactorily corrected using a small number of lenses.

DESCRIPTION OF THE EMBODIMENTS (2)

Embodiment 2 will now be described with reference to the drawings.

Figure 10:
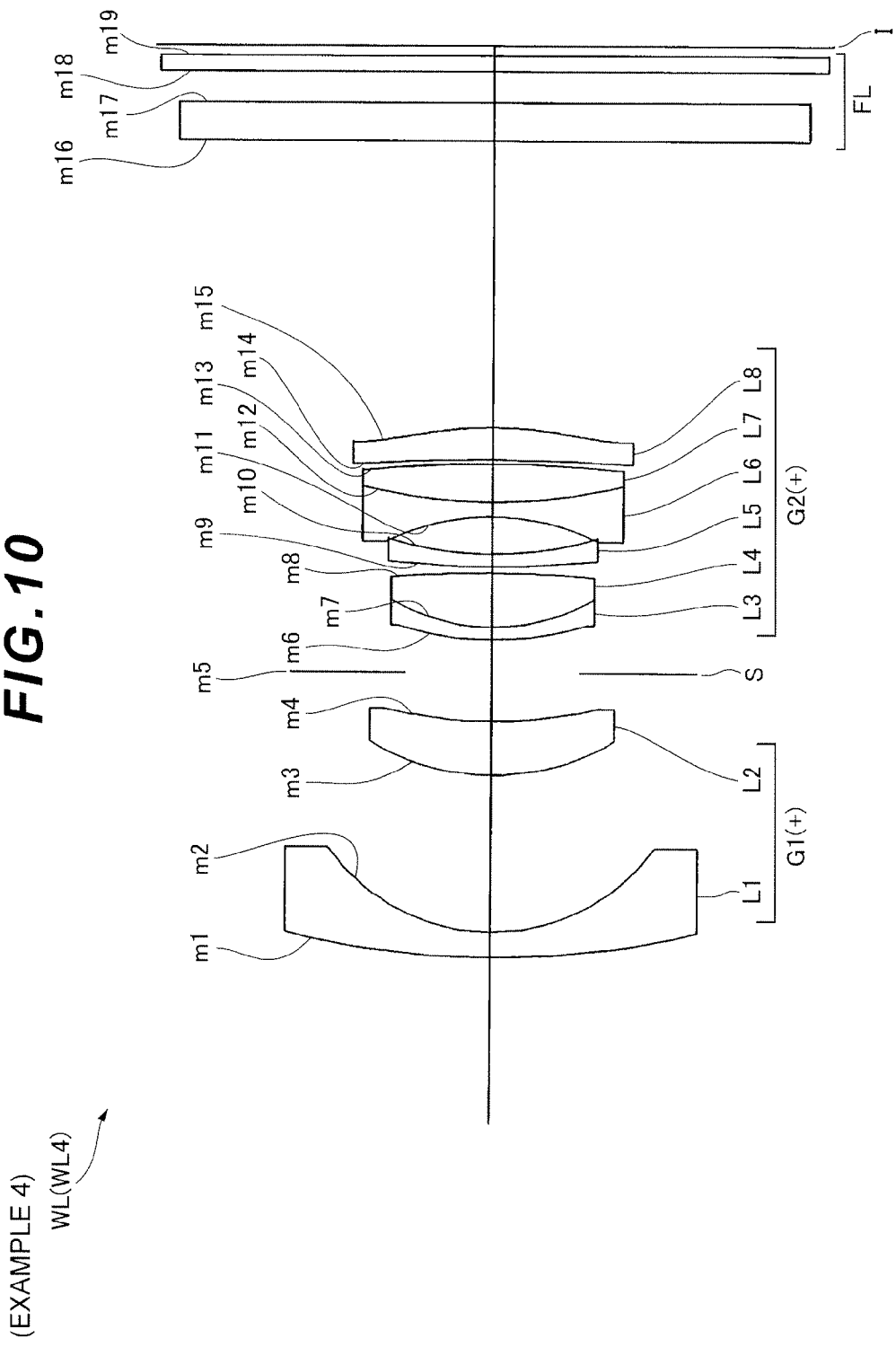
FIG. 10 is a cross-sectional view depicting a configuration of an optical system according to Example 4.

As illustrated in FIG. 10, an optical system WL of Embodiment 2 has, in order from an object, a first lens group G1, an aperture stop S and a second lens group G2, where the first lens group G1 includes, in order from the object, a negative lens L1 and a positive lens L2, the second lens group G2 includes a lens surface closest to the object (the lens surface m6 in the case of FIG. 10) that is a convex surface facing the object and a positive lens (the lens L8 in the case of FIG. 10) disposed closest to the image, and the following conditional expression (3) is satisfied.

$$0.172 < L1r2/L2r2 < 0.700 \qquad (3)$$

where L1r2 denotes a radius of curvature of the image side lens surface of the negative lens L1 of the first lens group G1, and L2r2 denotes a radius of curvature of the image side lens surface of the positive lens L2 of the first lens group G1.

According to this configuration, an optical system with which the lens barrel can be retracted into the camera when the camera is not used, but which still has compactness, wide angle of view (about 76°), brightness (Fno: about 2.8) and high optical performance, can be provided.

The conditional expression (3) specifies the ratio of the radius of curvature of the image side surface of the negative lens L1 and the image side surface of the positive lens L2 in the first lens group G1, and is used for satisfactorily correcting coma aberration, astigmatism, and distortion that are generated in the first lens group G1. If the lower limit value of the conditional expression (3) is not reached, the image side surface of the negative lens L1 becomes relatively smaller than the image side surface of the positive lens L2, which is advantageous for correcting the Petzval sum and downsizing the lenses, but makes it difficult to correct coma aberration and distortion of the total lens system. If the upper limit value of conditional expression (3) is exceeded, the image side surface of the negative lens L1 becomes relatively larger than the image side surface of the positive lens L2, which is advantageous for correcting distortion in the total lens system, but makes it difficult to correct curvature of field and coma aberration. Moreover, the distance between the negative lens L1 and the positive lens L2 must be increased to correct the Petzval sum in the first lens group G1, which makes downsizing impossible.

To demonstrate the effect of this embodiment with certainty, it is preferable that the lower limit value of the conditional expression (3) is 0.175. To demonstrate the effect of this embodiment to the maximum, it is preferable that the lower limit value of the conditional expression (3) is 0.180.

To demonstrate the effect of the embodiment with certainty, it is preferable that the upper limit value of the conditional expression (3) is 0.600. To demonstrate the effect of this embodiment to the maximum, it is preferable that the upper limit value of the conditional expression (3) is 0.500.

In the optical system WL according to this embodiment, it is preferable that the first lens group G1 has positive refractive power, and the negative lens L1 disposed closest to the object in the first lens group G1 has a concave surface facing the image. By this configuration, various aberrations can be satisfactorily corrected in the total lens system, while decreasing distortion generated in the first lens group G1.

In the optical system WL, according to this embodiment, it is preferable that the following conditional expression (4) is satisfied.

$$1.00 < f1/f2 < 9.00 \qquad (4)$$

where f1 denotes a focal length of the first lens group G1, and f2 denotes a focal length of the second lens group G2. The conditional expression (4) specifies the ratio of the focal length between the first lens group G1 and the second lens group G2. If the lower limit value of the conditional expression (4) is not reached, symmetric properties with respect to the aperture stop S are good, which is advantageous to correct coma aberration, distortion and lateral chromatic aberration, but the Petzval sum increases, making it difficult to correct curvature of field. If the upper limit value of the conditional expression (4) is exceeded, the focal length of the first lens group G1 becomes relatively too long compared with the focal length of the second lens group G2, which drops symmetric properties with respect to the aperture stop S, and becomes disadvantageous to correct coma aberration, distortion and lateral chromatic aberration.

To demonstrate the effect of this embodiment with certainty, it is preferable that the lower limit value of the conditional expression (4) is 1.05. To demonstrate the effect of this embodiment to the maximum, it is preferable that the lower limit value of the conditional expression (4) is 1.10.

To demonstrate the effect of this embodiment with certainty, it is preferable that the upper limit value of the conditional expression (4) is 8.00.

In the optical system WL according to this embodiment, it is preferable that the positive lens disposed closest to the image in the second lens group G2 is a meniscus lens having a convex surface facing the image. By this configuration, the incident angle to the image plane can be kept small without increasing the back focus and total length, therefore downsizing becomes possible. Moreover, the curvature of field and coma aberration can be satisfactorily corrected.

In the optical system WL, according to this embodiment, it is preferable that the second lens group G2 has at least two cemented lenses. By this configuration, longitudinal chromatic aberration, astigmatism, lateral chromatic aberration and coma aberration can be satisfactorily corrected.

In the optical system WL, according to this embodiment, it is preferable that the following conditional expression (5) is satisfied.

$$1.9 < TL/f < 2.5 \qquad (5)$$

where TL denotes a distance from the lens surface closest to the object in the optical system WL to the paraxial image surface, and f denotes a focal length of the optical system WL.

The conditional expression (5) specifies an appropriate total length of the optical system WL, to balance downsizing of the total system and correction of aberrations. If the lower limit value of the conditional expression (5) is not reached, the total length of the optical system WL, becomes short, which is advantageous for downsizing, but it becomes difficult to correct various aberrations including astigmatism, curvature of field and coma aberration, which makes it difficult to implement high optical performance. If the upper limit value of the conditional expression (5) is exceeded, it is advantageous to correct various aberrations including astigmatism, curvature of field and coma aberration, which implements high optical performance, but is not desirable for downsizing because the total length of the optical system WL becomes too long.

To demonstrate the effect of this embodiment with certainty, it is preferable that the lower limit value of the conditional expression (5) is 2.0. To demonstrate the effect of this embodiment to the maximum, it is preferable that the lower limit value of the conditional expression (5) is 2.1.

To demonstrate the effect of this embodiment with certainty, it is preferable that the upper limit value of the conditional expression (5) is 2.4. To demonstrate the effect of this embodiment to the maximum, it is preferable that the upper limit value of the conditional expression (5) is 2.3.

In the optical system WL according to this embodiment, it is preferable that the second lens group G2 includes, in order from the object, a cemented lens of a positive lens having a convex surface facing the object and a negative lens having a concave surface facing the image, a cemented lens of a negative lens having a concave surface facing the object and a positive lens having a convex surface facing the image, and a positive meniscus lens having a convex surface facing the image. By this configuration, various aberrations including spherical aberration and coma aberration can be satisfactorily corrected, and high optical performance can be implemented in the lenses as a whole.

In the optical system WL according to this embodiment, it is preferable that at least one surface of the second lens group G2 is aspherical. By this configuration, spherical aberration, astigmatism and coma aberration can be satisfactorily corrected.

According to the optical system WL having the above mentioned configuration of this embodiment, an optical system in which the lens barrel can be retracted into the camera when the camera is not used, but which still has compactness, wide angle of view, brightness and high optical performance can be implemented. Furthermore, a slimmer camera can be implemented by minimizing the thickness of the lens barrel portion in the retracted state.

Figure 20A:
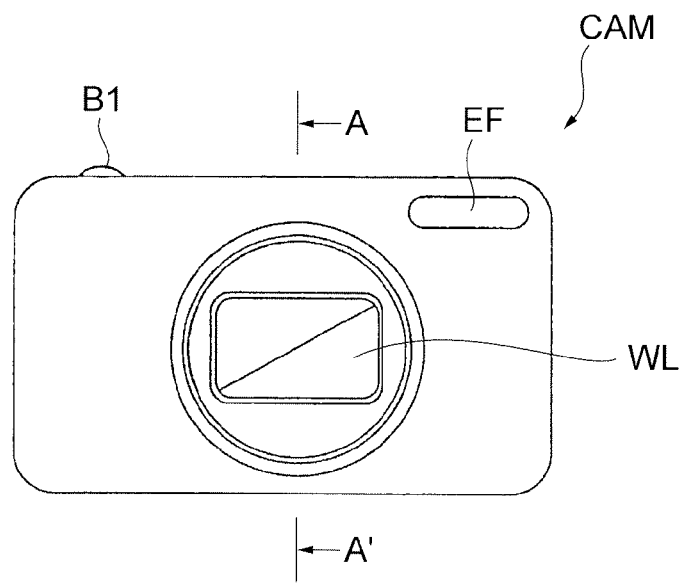
FIG. 20A is a front view.
Figure 20B:
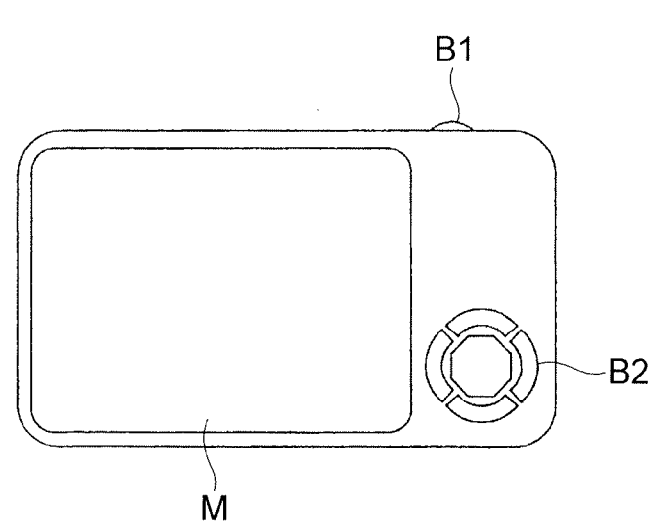
FIG. 20B is a rear view.
Figure 21:
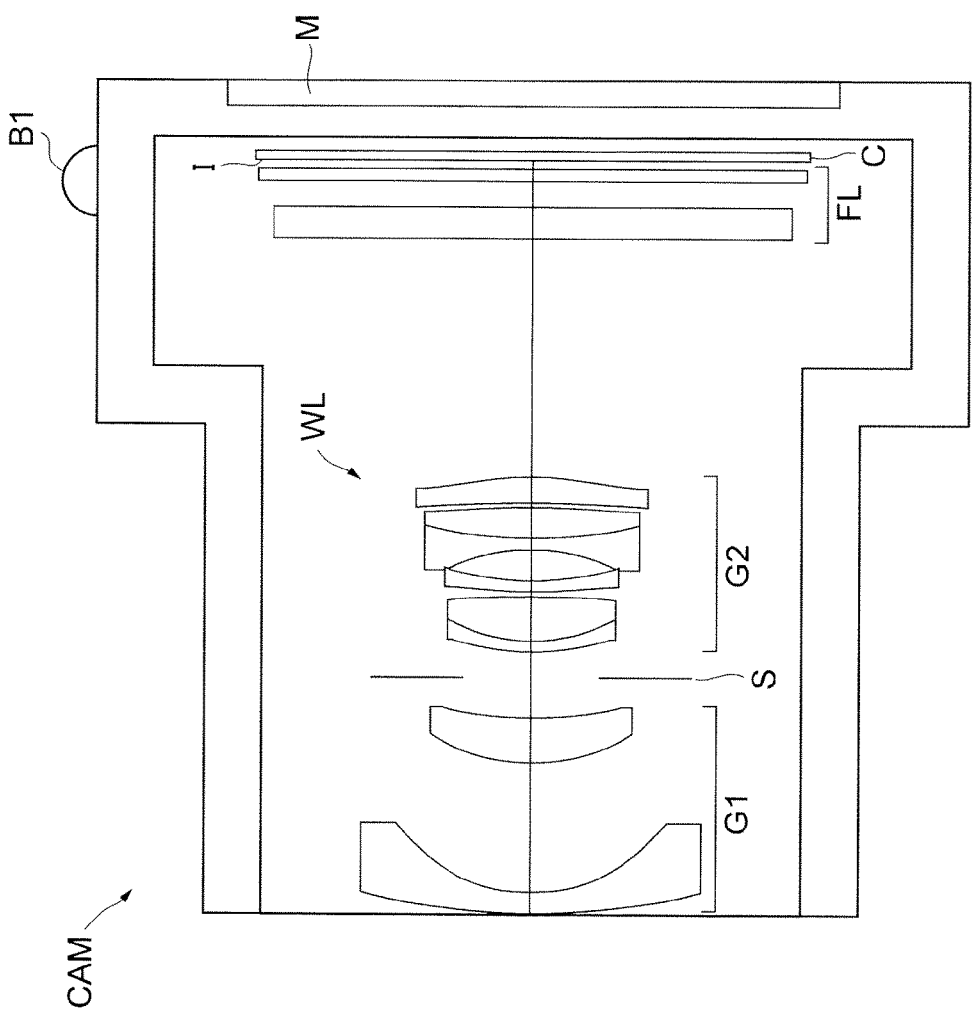
FIG. 21 is a cross-sectional view along the A-A' line in FIG. 20A.

FIG. 20 and FIG. 21 show a configuration of a digital still camera CAM (optical apparatus) as an optical apparatus including the optical system WL described above. In the digital still camera CAM, if a power button (not illustrated) is pressed, a shutter (not illustrated) of the image capturing lens (optical system WL) is opened, and light from an object is collected by the optical system WL and forms an image on a picture element C (e.g. CCD, CMOS) disposed on the image plane I (see FIG. 10). The object image formed on the picture element C is displayed on a liquid crystal monitor M, which is disposed on the rear face of the digital still camera CAM. The user determines a composition while viewing the liquid crystal monitor M, then presses a release button B1 to photograph the object image using the picture element C, and records and stores the image in a memory (not illustrated).

In the camera CAM, an auxiliary light emitting unit EF that emits auxiliary light when an object appears dark, and a function button B2 that is used to set various conditions of the digital still camera CAM are disposed. Here a compact type camera, where the camera CAM and the optical system WL are integrated, is shown as an example, but the optical apparatus may be a single lens reflex camera, where the lens barrel having the optical system WL and the camera body are detachable.

According to the camera CAM having the above configuration, where the optical system WL is included as the image-capturing lens, a camera in which the lens barrel can be retracted into the camera when the camera is not used, but which still has compactness, wide angle of view, brightness and high optical performance, can be implemented.

Figure 22:
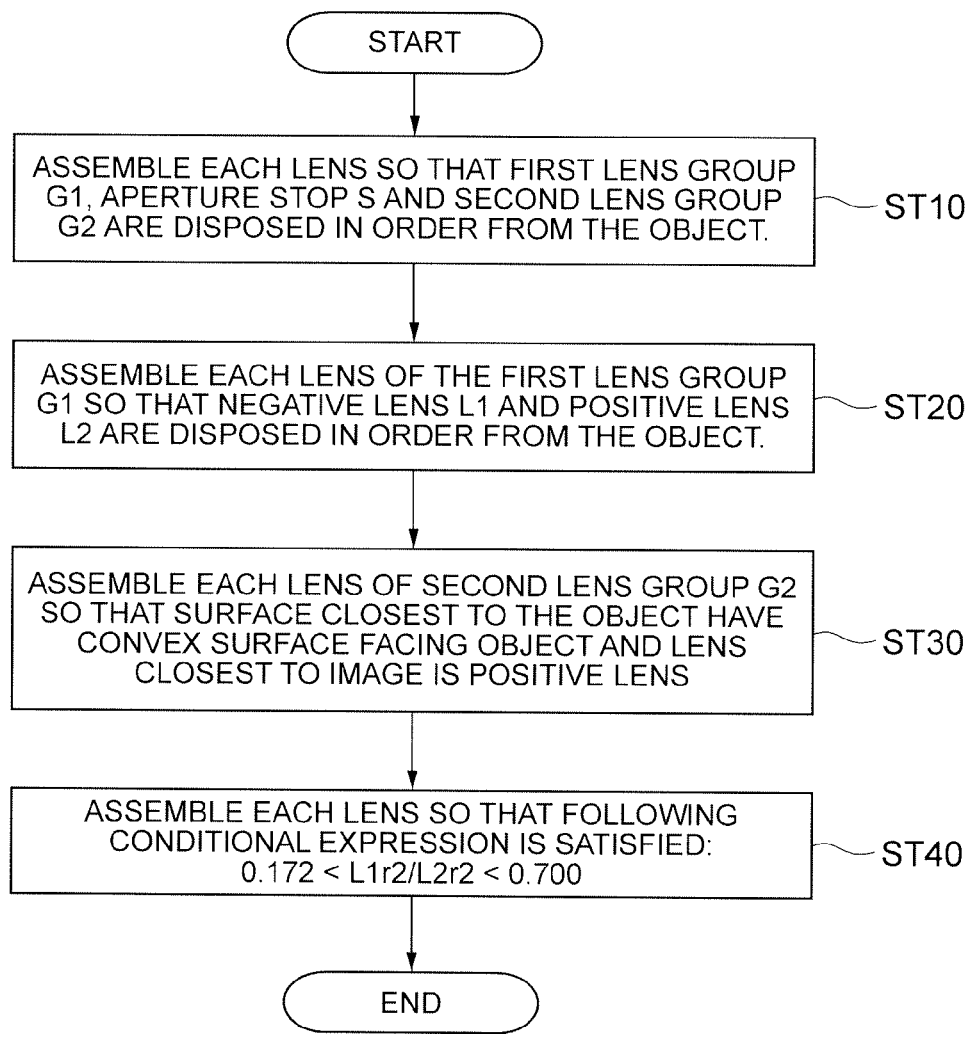
FIG. 22 is a flow chart depicting a method for manufacturing the optical system according to the embodiment represented by Examples 4 to 8.

Now a method for manufacturing the optical system WL will be described with reference to FIG. 22. First each lens is assembled in the lens barrel so that the first lens group G1, the aperture stop S and the second lens group G2 are disposed in order from the object (step ST10). In this step, each lens is assembled, as the first lens group G1, so that the negative lens L1 and the positive lens L2 are disposed in order from the object (step ST20). Then each lens is assembled, as the second lens group G2, so that the lens surface closest to the object is a convex surface facing the object, and the positive lens is disposed closest to the image (step ST30). Each lens is assembled so that the following conditional expression (3) is satisfied (step ST40).

$$0.172 < L1r2/L2r2 < 0.700 \qquad (3)$$

where $L1r2$ denotes a radius of curvature of the image side lens surface of the negative lens L1 of the first lens group G1, and $L2r2$ denotes a radius of curvature of the image side lens surface of the positive lens L2 of the first lens group G1.

For example, in the lens configuration according to this embodiment, as illustrated in the optical system WL in FIG. 10, each lens is assembled in the lens barrel, as the first lens group G1, so that a negative meniscus lens L1 having a concave surface facing the image and a positive meniscus lens L2 having a convex surface facing the object are disposed in order from the object. Then each lens is assembled in the lens barrel, as the second lens group G2, so that a cemented lens of a negative meniscus lens L3 having a convex surface facing the object and a positive biconvex lens L4, a negative meniscus lens L5 having a convex surface facing the object, a cemented lens of a negative biconvex lens L6 and a positive biconvex lens L7, and a positive meniscus lens L8 having a convex surface facing the image are disposed in order from the object. Here the conditional expression (3) is satisfied (corresponding value: 0.437).

According to the method for manufacturing the optical system WL of this embodiment, an optical system in which the lens barrel can be retracted into the camera when the camera is not used, but which still has compactness, and high optical performance can be implemented. Furthermore, an optical system that can contribute to a slimmer camera can be implemented by minimizing thickness of the lens barrel portion in the retracted state.

Example 2

Each example of Embodiment 2 (Example 4 to Example 8) will be described with reference to the drawings. Table 4 to Table 8 shown below are tables on each data in Example 4 to Example 8.

Each reference symbol in FIG. 10 related to Example 4 is independent from the other examples in order to prevent a complication of descriptions caused by an increase in the number of digits of a reference symbol. Therefore even if a reference symbol is the same as a drawing related to another example, this does not always mean that these composing elements are the same.

In each example, the aberration characteristics are calculated with respect to the C-line (wavelength: 656.2730 nm), the d-line (wavelength: 587.5620 nm), the F-line (wavelength: 486.1330 nm) and the g-line (wavelength: 435.8350 nm).

In the [Lens Group Data] in each table, G denotes a group number, "First surface of group" indicates a surface number of the surface closest to the object in each group, and "Group focal length" indicates a focal length of each group.

In [Conditional Expression] in each table, a value corresponding to each conditional expression (3) to (5) is shown.

In all the data values herein below, unless specifically indicated, "mm" is normally used as the unit of focal length f, radius of curvature R, surface distance D and other lengths, but the unit is not limited to "mm", and another appropriate unit may be used since an equivalent optical performance is obtained even if the optical system is proportionally expanded or proportionally reduced.

This description on the table is the same for all examples, and is therefore omitted below.

Example 4

Example 4 will be described with reference to FIG. 10, FIG. 11 and Table 4. As illustrated in FIG. 10, an optical system WL (WL4) according to Example 4 is a wide angle single focus lens, and has, in order from an object, a first lens group G1 having positive refractive power, an aperture stop S, a second lens group G2 having positive refractive power, and a filter group FL.

The first lens group G1 includes, in order from the object, a negative meniscus lens L1 having a concave surface facing the image, and a positive meniscus lens L2 having a convex surface facing the object.

The second lens group G2 includes, in order from the object, a cemented lens of a negative meniscus lens L3 having a convex surface facing the object and a positive biconvex lens L4, a negative meniscus lens L5 having a convex surface facing the object, a cemented lens of a negative biconcave lens L6 and a positive biconvex lens L7, and a positive meniscus lens L8 having a convex surface facing the image. The image side lens surface of the positive lens L8 is aspherical.

The filter group FL is constituted by a low-pass filter, an infrared cut-off filter or the like, in order to cut off the spatial frequencies exceeding the critical resolution of a solid-state picture element (e.g. CCD, CMOS) disposed on the image plane I.

Table 4 shows each data value of Example 4. The surface numbers 1 to 19 in Table 4 correspond to each optical surface of m1 to m19 shown in FIG. 1 respectively. In Example 4, surface 15 is aspherical.

TABLE 4

[Lens Data]

| Surface number | R | D | nd | vd |
|---|---|---|---|---|
| Object surface | ∞ | | | |
| 1 | 2.2578 | 0.0654 | 1.57957 | 53.74 |
| 2 | 0.5236 | 0.4054 | | |
| 3 | 0.6149 | 0.1396 | 1.77250 | 49.62 |
| 4 | 1.1992 | 0.1253 | | |
| 5(Stop S) | ∞ | 0.0832 | | |
| 6 | 0.8390 | 0.0327 | 1.75520 | 27.57 |
| 7 | 0.5307 | 0.1382 | 1.83481 | 42.73 |
| 8 | −3.2042 | 0.0163 | | |
| 9 | 2.3764 | 0.0327 | 1.69895 | 30.13 |
| 10 | 0.9620 | 0.0954 | | |
| 11 | −0.6331 | 0.0381 | 1.74077 | 27.74 |
| 12 | 1.4300 | 0.0969 | 1.88300 | 40.66 |
| 13 | −3.4365 | 0.0109 | | |
| 14 | −5.3852 | 0.0817 | 1.79050 | 45.01 |
| *15(Aspherical) | −0.9963 | 0.7377 | | |
| 16 | ∞ | 0.0997 | 1.51680 | 64.20 |
| 17 | ∞ | 0.0801 | | |

TABLE 4-continued

| 18 | ∞ | 0.0381 | 1.51680 | 64.20 |
|---|---|---|---|---|
| 19 | ∞ | 0.0272 | | |
| Image plane | ∞ | | | |

[Aspherical Data]
Surface 15

κ = 1.0000, A4 = 1.21955E+00, A6 = 3.81700E+00, A8 = 5.93920E+00, A10 = −3.00852E+01

[Various Data]

| f | 1.00 |
|---|---|
| Fno | 2.88 |
| ω | 38.86 |
| Y | 0.79 |
| BF | 0.932 |
| TL' | 2.21 |

[Lens Group Data]

| Group number | First surface of group | Group focal length |
|---|---|---|
| G1 | 1 | 66.96 |
| G2 | 6 | 1.22 |

[Conditional Expressions]

| Conditional expression (3) | L1r2/L2r2 = 0.437 |
|---|---|
| Conditional expression (4) | f1/f2 = 54.707 |
| Conditional expression (5) | TL/f = 2.209 |

As Table 4 shows, the optical system WL4 of Example 4 satisfies the conditional expressions (3) to (5).

Figure 11:
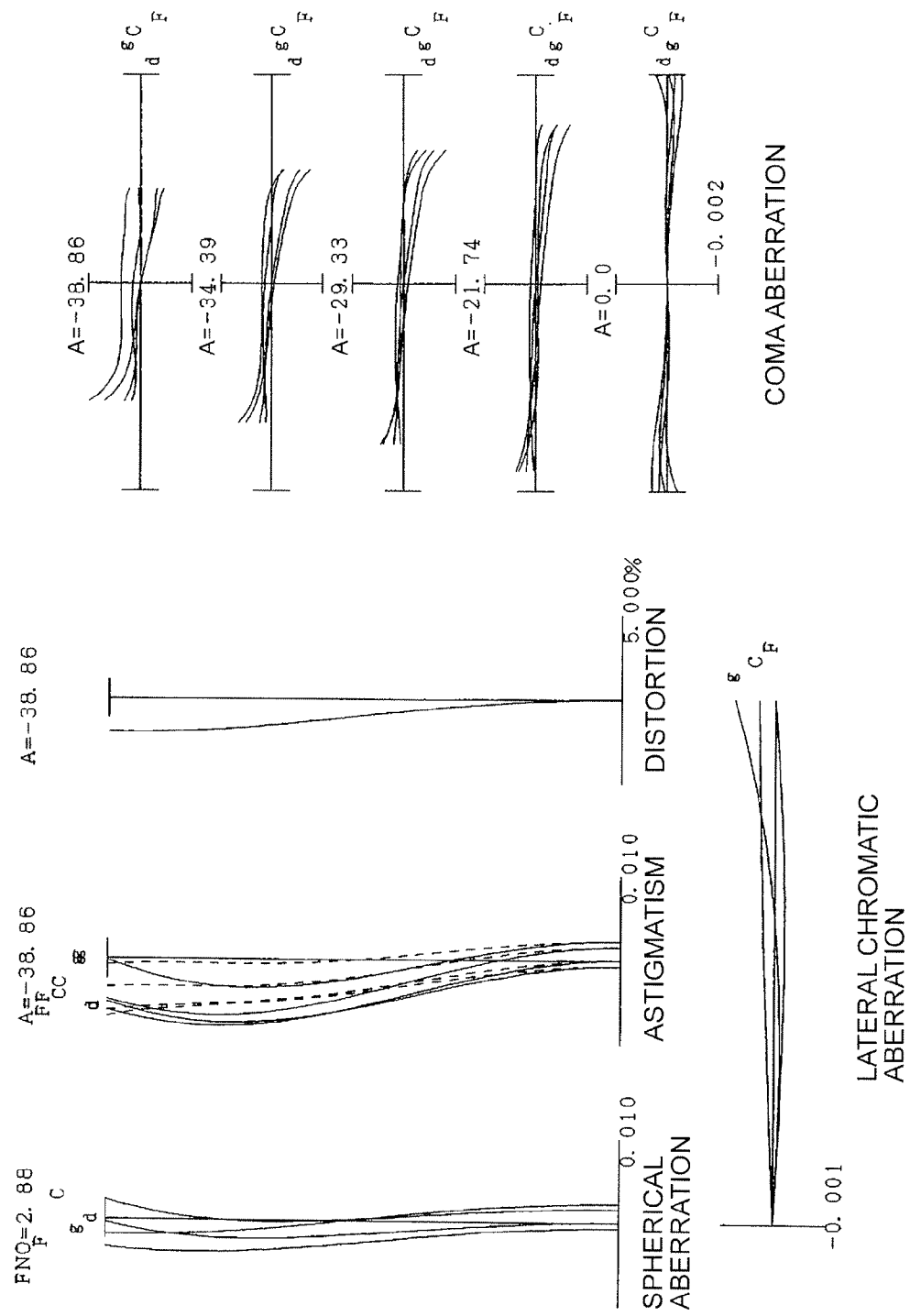
FIG. 11 are graphs showing various aberrations of the optical system according to Example 4 upon focusing on infinity.

FIG. 11 are graphs showing various aberrations (spherical aberration, astigmatism, distortion, coma aberration and lateral chromatic aberration) of the optical system WL4 according to Example 4 upon focusing on infinity.

In each graph showing aberrations, FNO denotes an F number and A denotes a half angle of view with respect to each image height (unit: °). d indicates aberration at the d-line, g indicates aberration at the g-line, C indicates aberration at the C-line, and F indicates aberration at the F-line. No indication means aberration at the d-line. In graphs showing astigmatism, the solid line indicates a sagittal image surface, and the broken line indicates a meridional image surface. The reference symbols of this example are the same for graphs showing various aberrations in each example to be described later.

As each graph showing aberrations in FIG. 11 clarifies, various aberrations are corrected satisfactorily, demonstrating that the optical system WL4 according to Example 4 has excellent image forming performance.

Example 5

Figure 12:
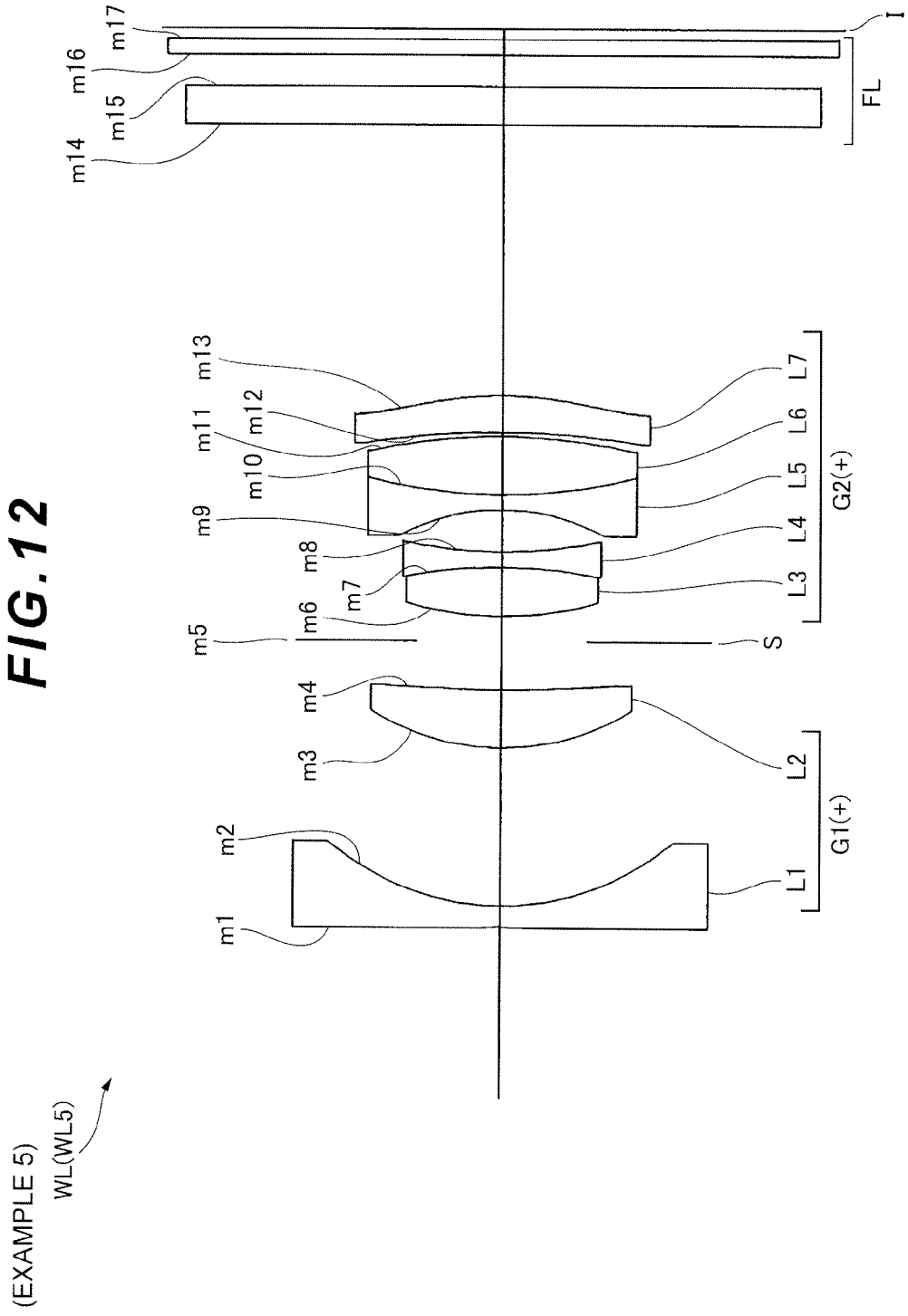
FIG. 12 is a cross-sectional view depicting a configuration of an optical system according to Example 5.

Example 5 will be described with reference to FIG. 12, FIG. 13 and Table 5. As illustrated in FIG. 12, an optical system WL (WL5) according to Example 5 is a wide angle single focus lens, and has, in order from an object, a first lens group G1 having positive refractive power, an aperture stop S, a second lens group G2 having positive refractive power, and a filter group FL.

The first lens group G1 includes, in order from the object, a negative biconcave lens L1 and a positive meniscus lens L2 having a convex surface facing the object.

The second lens group G2 includes, in order from the object, a cemented lens of a positive biconvex lens L3 and a negative biconcave lens L4, a cemented lens of a negative biconcave lens L5 and a positive biconvex lens L6, and a positive meniscus lens L7 having a convex surface facing the image. The image side lens surface of the positive lens L7 is aspherical.

The filter group FL is constituted by a low-pass filter, an infrared cut-off filter or the like, in order to cut off the spatial frequencies exceeding the critical resolution of a solid-state picture element (e.g. CCD, CMOS) disposed on the image plane I.

Table 5 shows each data value of Example 5. The surface numbers 1 to 17 in Table 5 correspond to each optical surface of m1 to m17 shown in FIG. 12 respectively. In Example 5, surface 13 is aspherical.

TABLE 5

[Lens Data]

| Surface number | R | D | nd | νd |
|---|---|---|---|---|
| Object surface | ∞ | | | |
| 1 | −629.2740 | 0.0545 | 1.57957 | 53.74 |
| 2 | 0.6862 | 0.4030 | | |
| 3 | 0.6216 | 0.1498 | 1.71300 | 53.96 |
| 4 | 3.8122 | 0.1225 | | |
| 5(Stop S) | ∞ | 0.0654 | | |
| 6 | 0.8972 | 0.1253 | 1.88300 | 40.66 |
| 7 | −1.2949 | 0.0408 | 1.69895 | 30.13 |
| 8 | 1.2951 | 0.1062 | | |
| 9 | −0.5587 | 0.0381 | 1.69895 | 30.13 |
| 10 | 1.4075 | 0.1470 | 1.75500 | 52.34 |
| 11 | −1.5477 | 0.0109 | | |
| 12 | −2.1784 | 0.0926 | 1.79050 | 44.98 |
| *13(Aspherical) | −0.9062 | 0.6873 | | |
| 14 | ∞ | 0.0997 | 1.51680 | 64.20 |
| 15 | ∞ | 0.0801 | | |
| 16 | ∞ | 0.0381 | 1.51680 | 64.20 |
| 17 | ∞ | 0.0272 | | |
| Image plane | ∞ | | | |

[Aspherical Data]
Surface 13

κ = 1.0000, A4 = 1.04405E+00, A6 = 4.01005E+00, A8 = 1.69331E+00, A10 = 0.00000E+00

[Various Data]

| f | 1.00 |
|---|---|
| Fno | 2.88 |
| ω | 38.91 |
| Y | 0.79 |
| BF | 0.885 |
| TL' | 2.24 |

[Lens Group Data]

| Group number | First surface of group | Group focal length |
|---|---|---|
| G1 | 1 | 2.21 |
| G2 | 6 | 1.99 |

[Conditional Expressions]

| Conditional expression (3) | L1r2/L2r2 = 0.180 |
|---|---|
| Conditional expression (4) | f1/f2 = 1.109 |
| Conditional expression (5) | TL/f = 2.242 |

As Table 5 shows, the optical system WL5 of Example 5 satisfies the conditional expressions (3) to (5).

Figure 13:
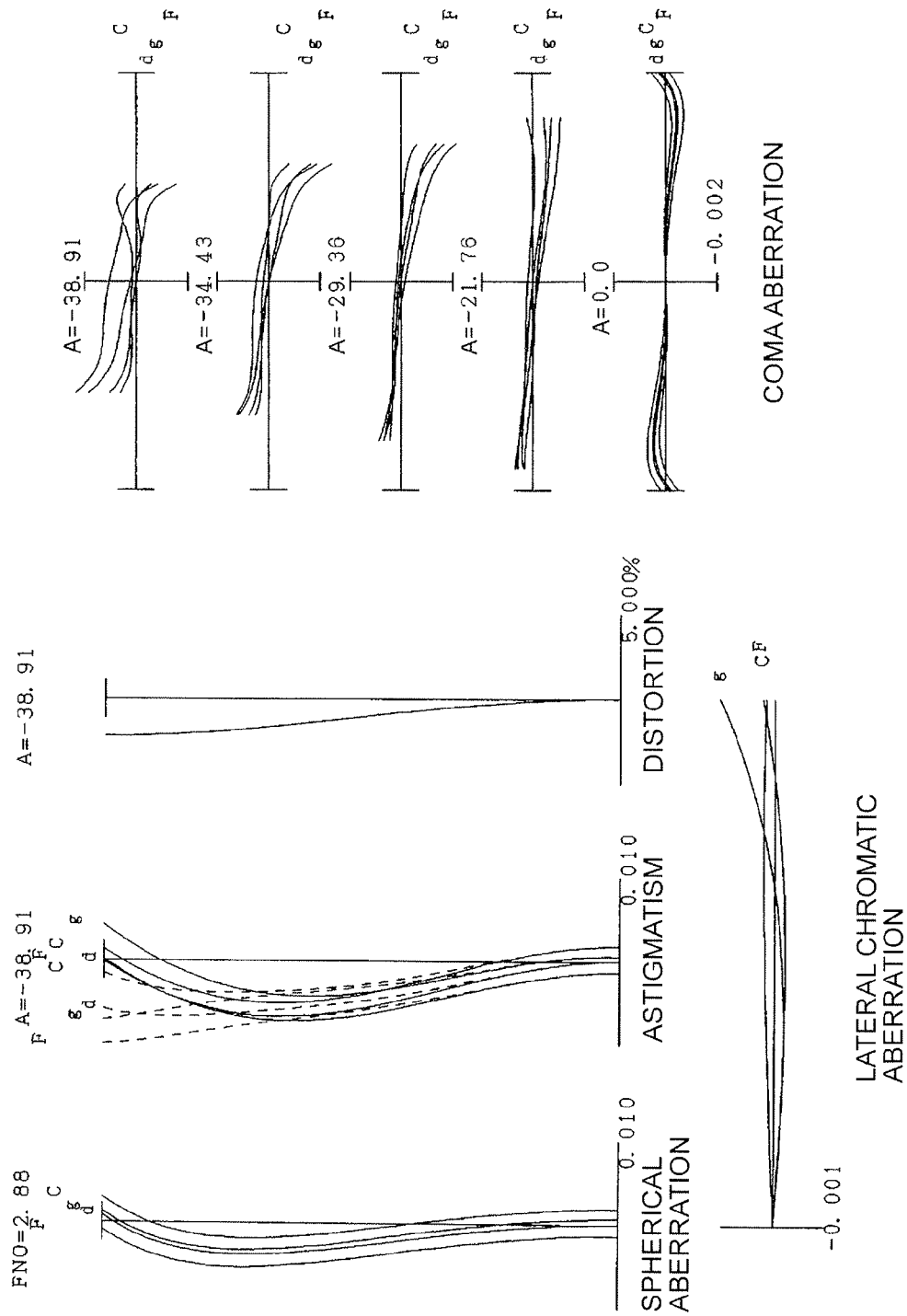
FIG. 13 are graphs showing various aberrations of the optical system according to Example 5 upon focusing on infinity.

FIG. 13 are graphs showing various aberrations (spherical aberration, astigmatism, distortion, coma aberration and lateral chromatic aberration) of the optical system WL5 according to Example 5 upon focusing on infinity. As each graph showing aberrations in FIG. 13 clarifies, various aberrations are satisfactorily corrected, demonstrating that the optical system WL5 according to Example 5 has excellent image forming performance.

Example 6

Figure 14:
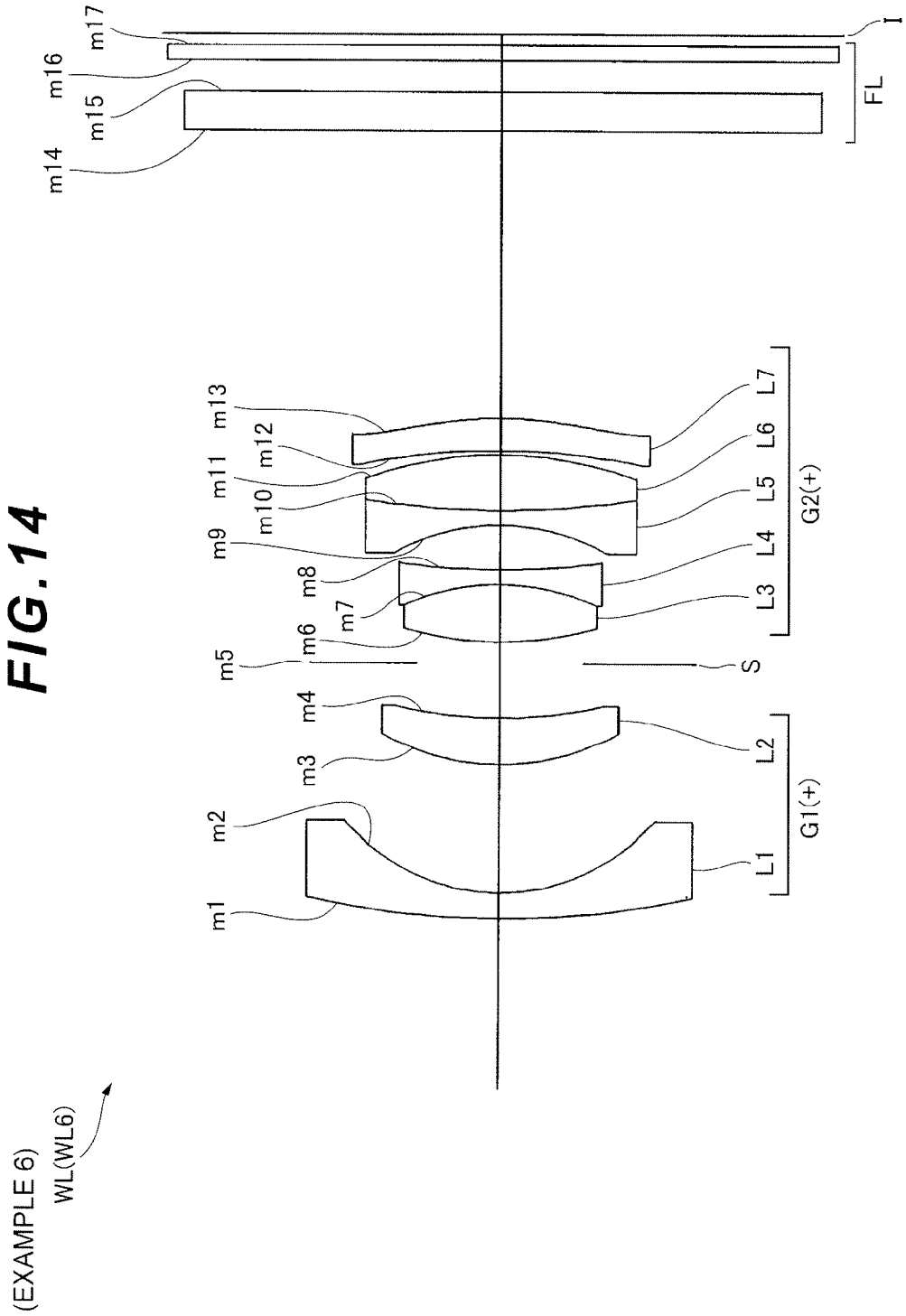
FIG. 14 is a cross-sectional view depicting a configuration of an optical system according to Example 6.

Example 6 will be described with reference to FIG. 14, FIG. 15 and Table 6. As illustrated in FIG. 14, an optical system WL (WL6) according to Example 6 is a wide angle single focus lens, and has, in order from an object, a first lens group G1 having positive refractive power, an aperture stop S, a second lens group G2 having positive refractive power, and a filter group FL.

The first lens group G1 includes, in order from the object, a negative meniscus lens L1 having a concave surface facing the image and a positive meniscus lens L2 having a convex surface facing the object.

The second lens group G2 includes, in order from the object, a cemented lens of a positive biconvex lens L3 and a negative biconcave lens L4, a cemented lens of a negative biconcave lens L5 and a positive biconvex lens L6, and a positive meniscus lens L7 having a convex surface facing the image. The image side lens surface of the positive lens L7 is aspherical.

The filter group FL is constituted by a low-pass filter, an infrared cut-off filter or the like, in order to cut off the spatial frequencies exceeding the critical resolution of a solid-state picture element (e.g. CCD, CMOS) disposed on the image plane I.

Table 6 shows each data value of Example 6. The surface numbers 1 to 17 in Table 6 correspond to each optical surface of m1 to m17 shown in FIG. 14 respectively. In Example 6, surface 13 is aspherical.

TABLE 6

[Lens Data]

| Surface number | R | D | nd | νd |
|---|---|---|---|---|
| Object surface | ∞ | | | |
| 1 | 2.3006 | 0.0654 | 1.57957 | 53.74 |
| 2 | 0.5242 | 0.3268 | | |
| 3 | 0.6120 | 0.1198 | 1.79500 | 45.31 |
| 4 | 1.2254 | 0.1389 | | |
| 5(Stop S) | ∞ | 0.0545 | | |
| 6 | 0.8972 | 0.1471 | 1.88300 | 40.66 |
| 7 | −0.6104 | 0.0381 | 1.69895 | 30.13 |
| 8 | 1.9132 | 0.1144 | | |
| 9 | −0.5568 | 0.0381 | 1.69895 | 30.13 |
| 10 | 2.3580 | 0.1416 | 1.75500 | 52.34 |
| 11 | −1.0186 | 0.0109 | | |
| 12 | −1.7973 | 0.0817 | 1.79050 | 44.98 |
| *13(Aspherical) | −1.0056 | 0.7339 | | |
| 14 | ∞ | 0.0997 | 1.51680 | 64.20 |
| 15 | ∞ | 0.0801 | | |
| 16 | ∞ | 0.0381 | 1.51680 | 64.20 |
| 17 | ∞ | 0.0272 | | |
| Image plane | ∞ | | | |

[Aspherical Data]
Surface 13

κ = 1.0000, A4 = 9.92351E−01, A6 = 2.97273E+00, A8 = 8.26531E4−00, A10 = −3.36149E+01

[Various Data]

| f | 1.00 |
|---|---|
| Fno | 2.88 |
| ω | 38.86 |
| Y | 0.79 |
| BF | 0.932 |
| TL' | 2.21 |

TABLE 6-continued

[Lens Group Data]

| Group number | First surface of group | Group focal length |
|---|---|---|
| G1 | 1 | 66.96 |
| G2 | 6 | 1.22 |

[Conditional Expressions]

| | |
|---|---|
| Conditional expression (3) | L1r2/L2r2 = 0.428 |
| Conditional expression (4) | f1/f2 = 54.707 |
| Conditional expression (5) | TL/f = 2.209 |

As Table 6 shows, the optical system WL6 of Example 6 satisfies the conditional expressions (3) to (5).

Figure 15:
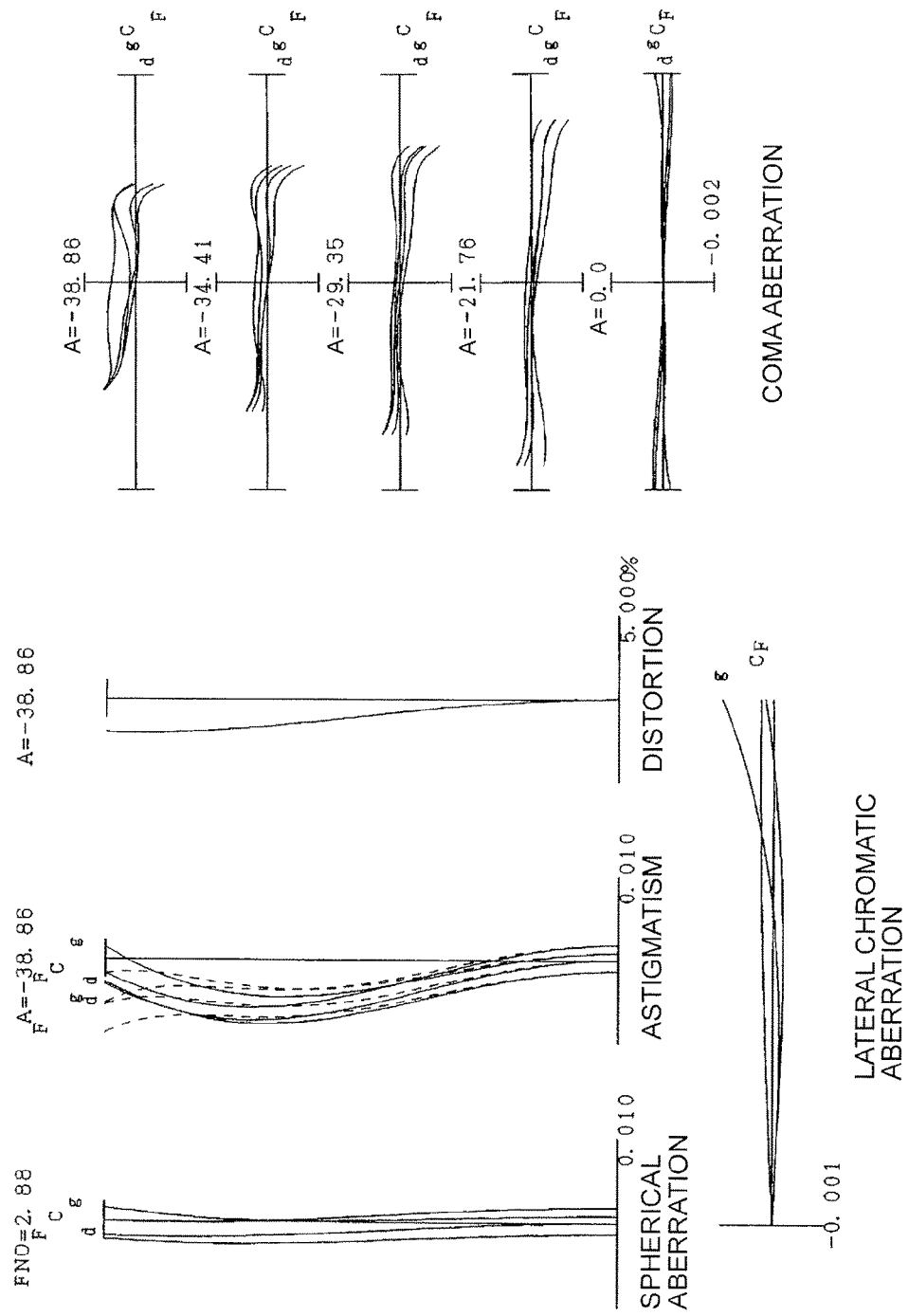
FIG. 15 are graphs showing various aberrations of the optical system according to Example 6 upon focusing on infinity.

FIG. 15 are graphs showing various aberrations (spherical aberration, astigmatism, distortion, coma aberration and lateral chromatic aberration) of the optical system WL6 according to Example 6 upon focusing on infinity. As each graph showing aberrations in FIG. 15 clarifies, various aberrations are satisfactorily corrected, demonstrating that the optical system WL6 according to Example 6 has excellent image forming performance.

Example 7

Figure 16:
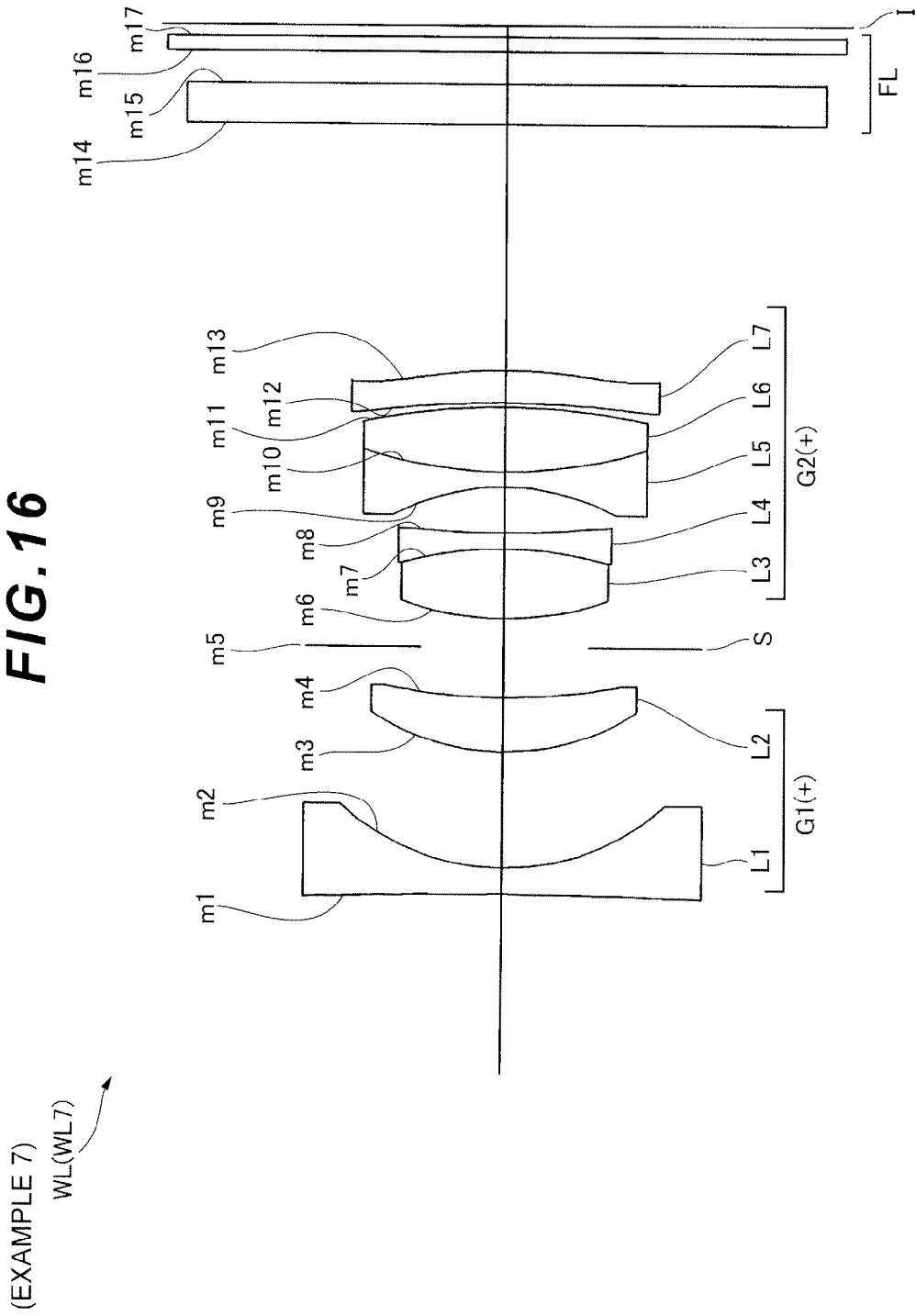
FIG. 16 is a cross-sectional view depicting a configuration of an optical system according to Example 7.

Example 7 will be described with reference to FIG. 16, FIG. 17 and Table 7. As illustrated in FIG. 16, an optical system WL (WL7) according to Example 7 is a wide angle single focus lens, and has, in order from an object, a first lens group G1 having positive refractive power, an aperture stop S, a second lens group G2 having positive refractive power, and a filter group FL.

The first lens group G1 includes, in order from the object, a negative biconcave lens L1 and a positive meniscus lens L2 having a convex surface facing the object.

The second lens group G2 includes, in order from the object, a cemented lens of a positive biconvex lens L3 and a negative biconcave lens L4, a cemented lens of a negative biconcave lens L5 and a positive biconvex lens L6, and a positive meniscus lens L7 having a convex surface facing the image. The image side lens surface of the positive lens L7 is aspherical.

The filter group FL is constituted by a low-pass filter, an infrared cut-off filter or the like, in order to cut off the spatial frequencies exceeding the critical resolution of a solid-state picture element (e.g. CCD, CMOS) disposed on the image plane I.

Table 7 shows each data value of Example 7. The surface numbers 1 to 17 in Table 7 correspond to each optical surface of m1 to m17 shown in FIG. 16 respectively. In Example 7, surface 13 is aspherical.

TABLE 7

[Lens Data]

| Surface number | R | D | nd | vd |
|---|---|---|---|---|
| Object surface | ∞ | | | |
| 1 | −13.2676 | 0.0654 | 1.53172 | 48.78 |
| 2 | 0.6131 | 0.2945 | | |
| 3 | 0.6163 | 0.1371 | 1.79500 | 45.31 |
| 4 | 1.5253 | 0.1253 | | |
| 5(Stop S) | ∞ | 0.0708 | | |
| 6 | 0.7852 | 0.1743 | 1.88300 | 40.66 |
| 7 | −1.0156 | 0.0408 | 1.75211 | 25.05 |
| 8 | 2.3728 | 0.1171 | | |

TABLE 7-continued

| 9 | −0.5930 | 0.0381 | 1.69895 | 30.13 |
|---|---|---|---|---|
| 10 | 1.1609 | 0.1634 | 1.79952 | 42.09 |
| 11 | −1.7522 | 0.0109 | | |
| 12 | −2.7233 | 0.0817 | 1.79050 | 45.01 |
| *13(Aspherical) | −1.1464 | 0.6216 | | |
| 14 | ∞ | 0.0997 | 1.51680 | 64.20 |
| 15 | ∞ | 0.0801 | | |
| 16 | ∞ | 0.0381 | 1.51680 | 64.20 |
| 17 | ∞ | 0.0272 | | |
| Image plane | ∞ | | | |

[Aspherical Data]
Surface 13

κ = 1.0000, A4 = 1.22717E+00, A6 = 3.46350E+00, A8 = 4.93210E+00, A10 = −3.04555E+01

[Various Data]

| | |
|---|---|
| f | 1.00 |
| Fno | 2.88 |
| ω | 38.86 |
| Y | 0.79 |
| BF | 0.820 |
| TL' | 2.14 |

[Lens Group Data]

| Group number | First surface of group | Group focal length |
|---|---|---|
| G1 | 1 | 10.42 |
| G2 | 6 | 1.31 |

[Conditional Expressions]

| | |
|---|---|
| Conditional expression (3) | L1r2/L2r2 = 0.402 |
| Conditional expression (4) | f1/f2 = 7.957 |
| Conditional expression (5) | TL/f = 2.139 |

As Table 7 shows, the optical system WL7 of Example 7 satisfies the conditional expressions (3) to (5).

Figure 17:
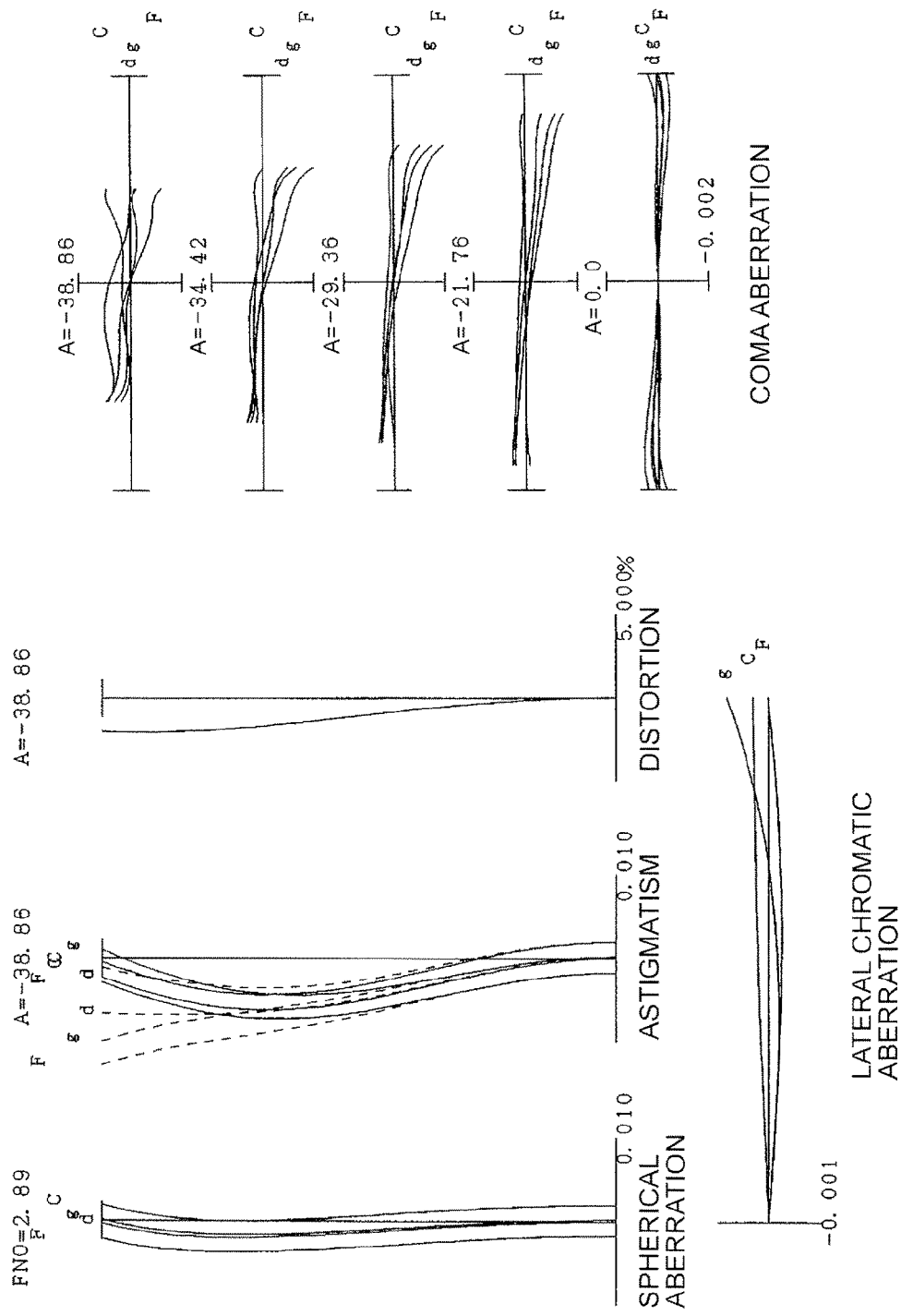
FIG. 17 are graphs showing various aberrations of the optical system according to Example 7 upon focusing on infinity.

FIG. 17 are graphs showing various aberrations (spherical aberration, astigmatism, distortion, coma aberration and lateral chromatic aberration) of the optical system WL7 according to Example 7 upon focusing on infinity. As each graph showing aberrations in FIG. 17 clarifies, various aberrations are satisfactorily corrected, demonstrating that the optical system WL7 according to Example 7 has excellent image forming performance.

Example 8

Figure 18:
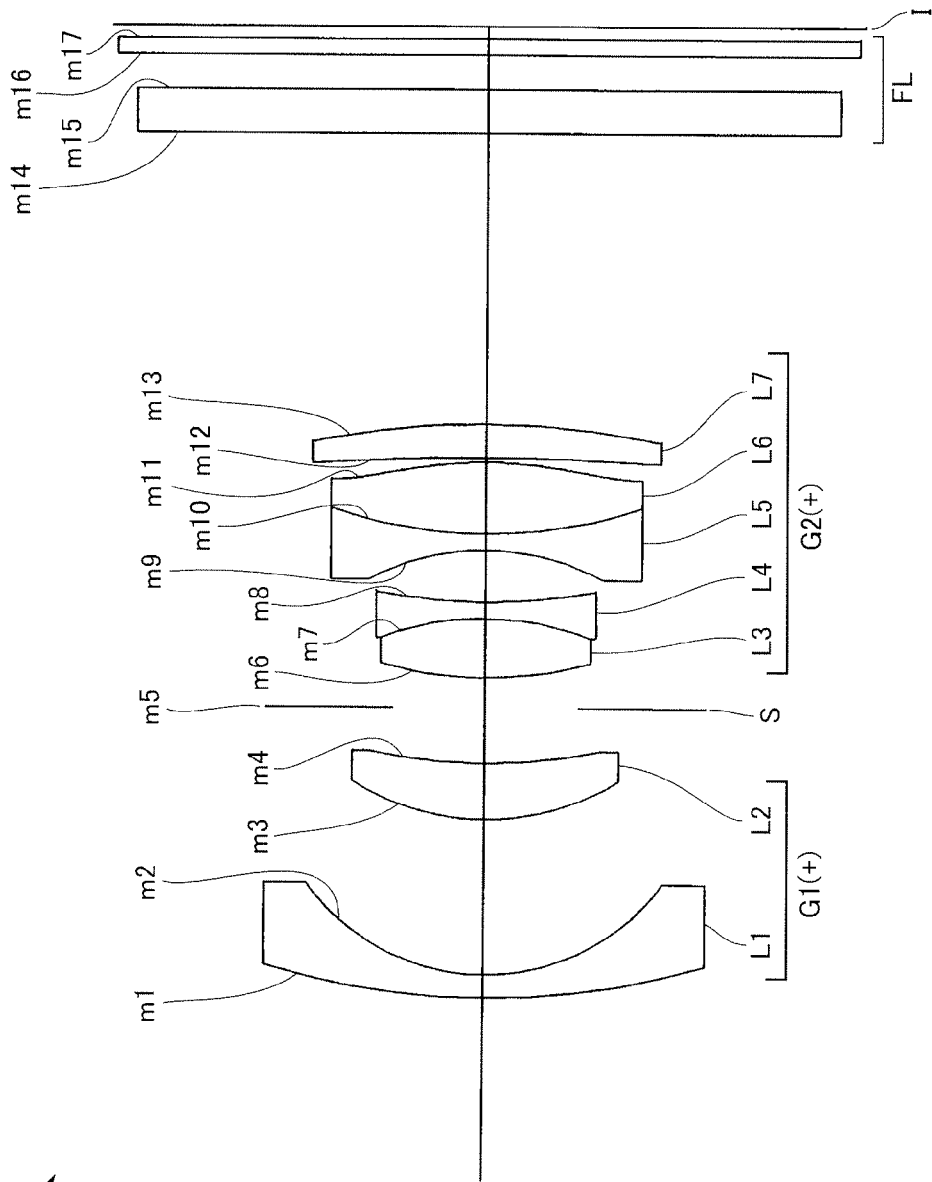
FIG. 18 is a cross-sectional view depicting a configuration of an optical system according to Example 8.

Example 8 will be described with reference to FIG. 18, FIG. 19 and Table 8. As illustrated in FIG. 18, an optical system WL (WL8) according to Example 8 is a wide angle single focus lens, and has, in order from an object, a first lens group G1 having positive refractive power, an aperture stop S, a second lens group G2 having positive refractive power, and a filter group FL.

The first lens group G1 includes, in order from the object, a negative meniscus lens L1 having a concave surface facing the image, and a positive meniscus lens L2 having a convex surface facing the object.

The second lens group G2 includes, in order from the object, a cemented lens of a positive biconvex lens L3 and a negative biconcave lens L4, a cemented lens of a negative biconcave lens L5 and a positive biconvex lens L6, and a positive meniscus lens L7 having a convex surface facing the image. The image side lens surface of the positive biconvex lens L6 is aspherical.

The filter group FL is constituted by a low-pass filter, an infrared cut-off filter or the like, in order to cut off the spatial frequencies exceeding the critical resolution of a solid-state picture element (e.g. CCD, CMOS) disposed on the image plane I.

Table 8 shows each data value of Example 8. The surface numbers 1 to 17 in Table 8 correspond to each optical surface of m1 to m17 shown in FIG. 18 respectively. In Example 8, surface 11 is aspherical.

TABLE 8

[Lens Data]

| Surface number | R | D | nd | vd |
|---|---|---|---|---|
| Object surface | ∞ | | | |
| 1 | 1.7851 | 0.0545 | 1.56883 | 56.00 |
| 2 | 0.5120 | 0.3595 | | |
| 3 | 0.5721 | 0.1307 | 1.71300 | 53.96 |
| 4 | 1.2689 | 0.1280 | | |
| 5(Stop S) | ∞ | 0.0681 | | |
| 6 | 0.8681 | 0.1362 | 1.88300 | 40.66 |
| 7 | −0.6973 | 0.0381 | 1.67270 | 32.19 |
| 8 | 1.3555 | 0.1198 | | |
| 9 | −0.5636 | 0.0381 | 1.69895 | 30.13 |
| 10 | 1.1330 | 0.1634 | 1.77377 | 47.25 |
| *11(Aspherical) | −0.9531 | 0.0109 | | |
| 12 | −5.4466 | 0.0763 | 1.76684 | 46.78 |
| 13 | −2.0345 | 0.6752 | | |
| 14 | ∞ | 0.0997 | 1.51680 | 64.20 |
| 15 | ∞ | 0.0801 | | |
| 16 | ∞ | 0.0381 | 1.51680 | 64.20 |
| 17 | ∞ | 0.0272 | | |
| Image plane | ∞ | | | |

[Aspherical Data]
Surface 11

κ = 1.0000, A4 = 1.15623E+00, A6 = 6.18674E+00,
A8 = −9.96092E+00, A10 = 0.00000E+00

[Various Data]

| f | 1.00 |
|---|---|
| Fno | 2.88 |
| ω | 38.88 |
| Y | 0.79 |
| BF | 0.871 |
| TL' | 2.19 |

[Lens Group Data]

| Group number | First surface of group | Group focal length |
|---|---|---|
| G1 | 1 | 8.13 |
| G2 | 6 | 1.33 |

[Conditional Expressions]

| Conditional expression (3) | L1r2/L2r2 = 0.403 |
|---|---|
| Conditional expression (4) | f1/f2 = 6.123 |
| Conditional expression (5) | TL/f = 2.195 |

As Table 8 shows, the optical system WL8 of Example 8 satisfies the conditional expressions (3) to (5).

Figure 19:
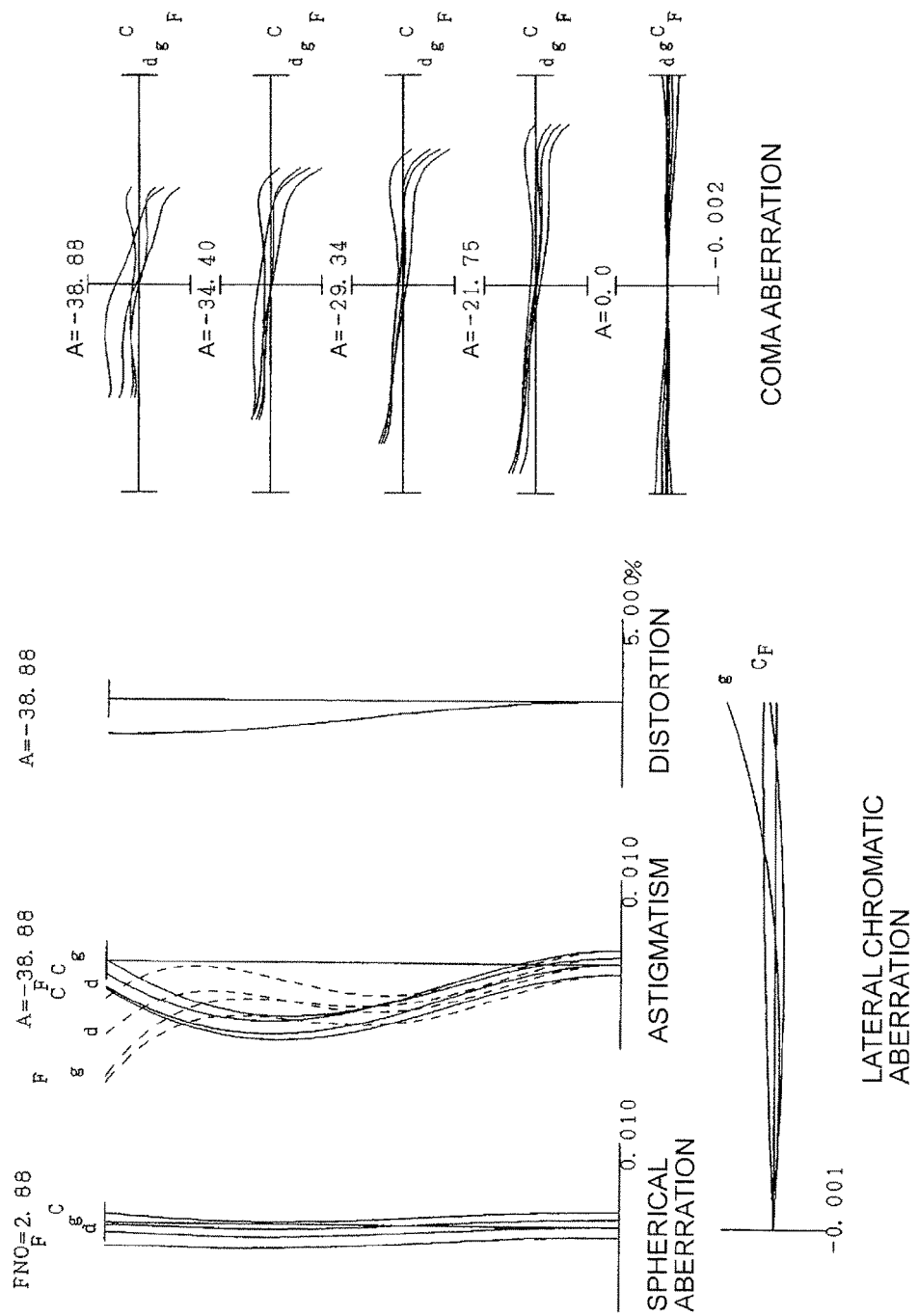
FIG. 19 are graphs showing various aberrations of the optical system according to Example 8 upon focusing on infinity.

FIG. 19 are graphs showing various aberrations (spherical aberration, astigmatism, distortion, coma aberration and lateral chromatic aberration) of the optical system WL8 according to Example 8 upon focusing on infinity. As each graph showing aberrations in FIG. 19 clarifies, various aberrations are satisfactorily corrected, demonstrating that the optical system WL8 according to Example 8 has excellent image forming performance.

According to each example described above, an optical system in which the lens barrel can be retracted into the camera when the camera is not used, but which still has compactness, wide angle of view (about 76°), brightness (Fno: about 2.8) and high optical performance can be implemented.

To assist in understanding the invention, the invention was described using the configuration requirements of the embodiments, but needless to say, the present invention is not limited to these embodiments.

EXPLANATION OF NUMERALS AND CHARACTERS

W1 (WL1 to WL8) optical system
L1 first lens
L2 second lens
L3 third lens
S aperture stop
FL filter group
I image plane
CAM digital still camera (optical apparatus)

The invention claimed is:

1. An optical system, comprising, in order from an object:
a first lens having negative refractive power;
a second lens, being a positive single meniscus lens and having a convex surface facing the object;
an aperture stop; and
a third lens having a convex surface facing the object, the following conditional expression being satisfied:

$$6.6<|f12/f|$$

where
f12 denotes a composite focal length of the first lens and the second lens, and
f denotes a focal length of the optical system, and the following conditional expression being satisfied:

$$0.75<\{(-f1)/d\}/f<1.20$$

where
f1 denotes a focal length of the first lens, and
d denotes a distance on an optical axis from an object side surface of the first lens to an image side surface of a lens located closest to the image.

2. The optical system according to claim 1, wherein the first lens is a negative meniscus lens having a concave surface facing the image.

3. The optical system according to claim 1, wherein the third lens has positive refractive power.

4. The optical system according to claim 1, wherein the image side surface of the lens located closest to the image is aspherical.

5. The optical system according to claim 1, wherein the first lens, the second lens and the third lens are all spherical lenses.

6. An optical apparatus, which includes the optical system according to claim 1.

7. A method for manufacturing an optical system, including, in order from an object, a first lens having negative refractive power, a second lens, being a positive single meniscus lens and having a convex surface facing the object, an aperture stop, and a third lens having a convex surface facing the object,
the method including: assembling each lens in a lens barrel so as to satisfy the following expression:

$$6.6<|f12/f|$$

where
f12 denotes a composite focal length of the first lens and the second lens, and f denotes a focal length of the optical system, and so as to satisfy the following expression:

$$0.75 < \{(-f1)/d\}f < 1.20$$

where f1 denotes a focal length of the first lens, and d denotes a distance on an optical axis from an object side surface of the first lens to an image side surface of a lens located closest to the image.

8. An optical system, comprising, in order from an object:

a first lens having negative refractive power;

a second lens, being a positive single meniscus lens and having a convex surface facing the object;

an aperture stop; and a third lens having positive refractive power and having a convex surface facing the object, the following conditional expression being satisfied:

$$6.6 < |f12/f|$$

where f12 denotes a composite focal length of the first lens and the second lens, and f denotes a focal length of the optical system.

9. A method for manufacturing an optical system, including, in order from an object, a first lens having negative refractive power, a second lens, being a positive single meniscus lens and having a convex surface facing the object, an aperture stop, and a third lens having positive refractive power and having a convex surface facing the object, the method including: assembling each lens in a lens barrel so as to satisfy the following expression:

$$6.6 < |f12/f|$$

where f12 denotes a composite focal length of the first lens and the second lens, and f denotes a focal length of the optical system.

* * * * *